US012748470B2

(12) United States Patent
Kwak

(10) Patent No.: US 12,748,470 B2
(45) Date of Patent: Sep. 29, 2026

(54) METHOD FOR CONTROLLING SURFACE HEAT GENERATION ELECTRONIC DEVICE AND STORAGE MEDIUM THEREFOR

(71) Applicant: SAMSUNG ELECTRONICS CO., LTD., Suwon-si (KR)

(72) Inventor: Kwonchon Kwak, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 936 days.

(21) Appl. No.: 17/977,426

(22) Filed: Oct. 31, 2022

(65) Prior Publication Data

US 2023/0132431 A1 May 4, 2023

Related U.S. Application Data

(63) Continuation of application No. PCT/KR2022/015307, filed on Oct. 11, 2022.

(30) Foreign Application Priority Data

Nov. 1, 2021 (KR) ........................ 10-2021-0148142
Nov. 24, 2021 (KR) ........................ 10-2021-0163703

(51) Int. Cl.
*H02J 7/00* (2026.01)
*G06F 1/20* (2006.01)
(Continued)

(52) U.S. Cl.
CPC .............. *G06F 1/206* (2013.01); *G06F 1/203* (2013.01); *H02J 7/975* (2026.01)

(58) Field of Classification Search
CPC ..... G06F 1/206; G06F 1/203; H02J 7/007192
(Continued)

(56) References Cited

U.S. PATENT DOCUMENTS 6,188,202 B1 * 2/2001 Yagi .................. H02J 7/007184 320/125
8,860,376 B2 * 10/2014 Kimura ............. H02J 7/007194 320/152

(Continued)

FOREIGN PATENT DOCUMENTS

JP 2006203980 A 8/2006
JP 2008005645 A 1/2008

(Continued)

OTHER PUBLICATIONS

International Search Report and Written Opinion for International Application No. PCT/KR2022/015307; International Filing Date Oct. 11, 2022; Date of Mailing Jan. 12, 2023; 11 Pages.

(Continued)

*Primary Examiner* — Alexis B Pacheco
(74) *Attorney, Agent, or Firm* — CANTOR COLBURN LLP

(57) ABSTRACT

An electronic device having a housing, a battery, a charging circuit, a plurality of temperature sensors in the housing, a processor operatively connected with the battery, the charging circuit, and the plurality of temperature sensors, and a memory. The memory storing instructions configured to, when executed, enable the electronic device to measure temperature values using one or more of the plurality of temperature sensors, in response to a temperature value associated with the battery being within a threshold value, calculate a predicted surface temperature based on at least one of the measured temperature values and a position of each temperature sensor, identify a control step among a plurality of control steps based on an operational state of at least one device associated with the electronic device and the predicted surface temperature, and adjust charging (Continued)

power for the battery through the charging circuit in response to the identified control step.

16 Claims, 15 Drawing Sheets

(51) Int. Cl.
*H02J 7/14* (2006.01)
*H02J 7/90* (2026.01)

(58) Field of Classification Search
USPC .......................................................... 320/109
See application file for complete search history.

(56) References Cited

U.S. PATENT DOCUMENTS

| | | | | |
|---|---|---|---|---|
| 10,505,403 | B1* | 12/2019 | Smith | H02J 50/60 |
| 10,860,060 | B1 | 12/2020 | Ranjan et al. | |
| 11,662,391 | B1* | 5/2023 | Nachman | H02J 7/005 320/132 |
| 2006/0001405 | A1 | 1/2006 | Nakagawa | |
| 2007/0145954 | A1 | 6/2007 | Kawahara et al. | |
| 2008/0136372 | A1 | 6/2008 | Eto | |
| 2009/0085527 | A1* | 4/2009 | Odaohhara | H02J 7/007194 320/150 |
| 2010/0225281 | A1* | 9/2010 | Sato | H02J 7/007194 320/152 |
| 2010/0270970 | A1* | 10/2010 | Toya | H02J 7/0042 320/108 |
| 2011/0037438 | A1* | 2/2011 | Bhardwaj | H02J 7/0071 320/152 |
| 2011/0316486 | A1* | 12/2011 | Inaba | H01M 10/48 320/150 |
| 2012/0025773 | A1* | 2/2012 | Wang | H02J 7/00714 320/129 |
| 2012/0235636 | A1* | 9/2012 | Partovi | H02J 7/0042 320/108 |
| 2013/0289792 | A1 | 10/2013 | Cheng et al. | |
| 2014/0195066 | A1 | 7/2014 | Nanda et al. | |
| 2015/0069975 | A1* | 3/2015 | Farah | H02J 7/007194 320/150 |
| 2015/0229155 | A1 | 8/2015 | Sporck et al. | |
| 2016/0056664 | A1* | 2/2016 | Partovi | B60L 53/122 307/104 |
| 2016/0062326 | A1 | 3/2016 | Bang et al. | |
| 2016/0181849 | A1* | 6/2016 | Govindaraj | H02J 7/0044 320/108 |
| 2017/0207647 | A1* | 7/2017 | Zhang | G01K 1/14 |
| 2019/0145833 | A1* | 5/2019 | Ryu | H01M 50/569 340/870.17 |
| 2020/0021115 | A1* | 1/2020 | Files | G06F 1/189 |
| 2020/0073460 | A1 | 3/2020 | Lee et al. | |
| 2020/0076244 | A1* | 3/2020 | Smith | G01K 7/42 |
| 2020/0367176 | A1 | 11/2020 | Lee et al. | |
| 2021/0096633 | A1 | 4/2021 | Rintamaeki et al. | |
| 2022/0333998 | A1* | 10/2022 | Libeer | G01K 7/02 |
| 2023/0113227 | A1* | 4/2023 | Miller | H01M 10/443 320/136 |

FOREIGN PATENT DOCUMENTS

| | | | |
|---|---|---|---|
| JP | 2008124946 | A | 5/2008 |
| JP | 2010016998 | A | 1/2010 |
| JP | 4660523 | B2 | 3/2011 |
| JP | 2012110221 | A | 6/2012 |
| JP | 2013153244 | A | 8/2013 |
| JP | 6636439 | B2 | 1/2020 |
| JP | 6734083 | A | 8/2020 |
| KR | 20160026329 | A | 3/2016 |
| KR | 20170121524 | A | 11/2017 |
| KR | 20180064934 | A | 6/2018 |
| KR | 20200132161 | A | 11/2020 |
| WO | 2021086049 | A1 | 5/2021 |

OTHER PUBLICATIONS

Extended European Search Report Issued In EP Application No. 2287412.9-1218, Mail Date Oct. 18, 2024, 11 Pages.
Extended European Search Report Issued In EP Application No. 22887412.9-1218; Mail Date Dec. 18, 2025; 6 Pages.
Korean Office Action Issued In KR Application No. 10-2021-0163703 ; Mail Date Jan. 9, 2026; 24 Pages.
Indian Office Action Issued In IN Application No. 202447038427, Mail Date Apr. 30, 2026, 7 Pages.

* cited by examiner

| Temperature sensor | T1 | T2 | T3 | T4 | T5 | ... | Tn |
|---|---|---|---|---|---|---|---|
| AP_THM | 36 | 38 | 37 | 39 | 46 | ... | ... |
| CHG_THM | 40 | 42 | 45 | 44 | 42 | ... | ... |
| USB_THM | 36 | 38 | 40 | 39 | 45 | ... | ... |
| WIFI_THM | 38 | 43 | 45 | 47 | 40 | ... | ... |
| PAM_THM | 40 | 34 | 36 | 44 | 39 | ... | ... |
| BAT_THM | 38 | 39 | 40 | 44 | 40 | ... | ... |
| Predicted surface temperature | 40 | 42 | 45 | 47 | 46 | ... | ... |

FIG. 8A

Time = T1

| User Activity Event Temperature Parameter | | | | | | | | |
|---|---|---|---|---|---|---|---|---|
| Level | Internal input device (Keyboard/ Keypad) | Use external input device (USB/WIF/BT)-keyboard | LCD OFF | Connect external display | Use communication (LTE/ 5G) | WIFI ON | CHARGING ON | Temperature step |
| Temperature sensor | Predicted surface temperature (40) | Predicted surface temperature (40) | AP_THM (36) | USB_THM (36) | PAM_THM (40) | WIFI_THM (38) | CHG_THM (40) | |
| Step 0 | +1 | -1 | -1 | -1 | +3 | +1 | +3 | <=38 |
| Step 1 | +2 | -2 | -1 | -2 | +3 | +1 | +4 | 38<C<=40 |
| Step 2 | +2 | -2 | -1 | -3 | +3 | +2 | +5 | 40<C<=43 |
| Step 3 | +3 | -2 | -2 | -3 | +4 | +3 | +5 | 43<C<=45 |
| Step 4 | +3 | -3 | -2 | -1 | +4 | +2 | +4 | 45<T<=48 |
| Step 5 | +4 | -3 | -1 | -2 | +4 | +3 | +6 | <=50 |
| Temperature | 42 | 38 | 35 | 35 | 43 | 39 | 44 | 44(Level3) |

FIG. 8B

Time = T3

| User Activity Event Temperature Parameter | | | | | | | | |
|---|---|---|---|---|---|---|---|---|
| Level | Internal input device (Keyboard/ Keypad) | Use external input device (USB/WIF/BT)-keyboard | LCD OFF | Connect external display | Use communication (LTE/ 5G) | WIFI ON | CHARGING ON | Temperature step |
| Temperature sensor | Predicted surface temperature (45) | Predicted surface temperature (45) | AP_THM (37) | USB_THM (40) | PAM_THM (36) | WIFI_THM (39) | CHG_THM (43) | |
| Step 0 | +1 | -1 | -1 | -1 | +3 | +1 | +3 | <=38 |
| Step 1 | +2 | -2 | -1 | -2 | +3 | +1 | +4 | 38<C<=40 |
| Step 2 | +2 | -2 | -1 | -3 | +3 | +2 | +5 | 40<C<=43 |
| Step 3 | +3 | -2 | -2 | -3 | +4 | +3 | +5 | 43<C<=45 |
| Step 4 | +3 | -3 | -2 | -1 | +4 | +2 | +4 | 45<T<=48 |
| Step 5 | +4 | -3 | -1 | -2 | +4 | +3 | +6 | 48<C<=50 |
| Temperature | 47 | 45 | 37 | 38 | 39 | 40 | 43 | 47(Level4) |

FIG. 8C

Time = T5

User Activity Event Temperature Parameter

| Level | Internal input device (Keyboard/ Keypad) | Use external input device (USB/WIF/BT)-keyboard | LCD OFF | Connect external display | Use communication (LTE/ 5G) | WIFI ON | CHARGING ON | Temperature step |
|---|---|---|---|---|---|---|---|---|
| Temperature sensor | Predicted surface temperature (46) | Predicted surface temperature (46) | AP_THM 46 | USB_THM (45) | PAM_THM (39) | WIFI_THM (40) | CHG_THM (42) | |
| Step 0 | +1 | -1 | -1 | -1 | +3 | +1 | +3 | <=38 |
| Step 1 | +2 | -2 | -1 | -2 | +3 | +1 | +4 | 38<C<=40 |
| Step 2 | +2 | -2 | -1 | -3 | +3 | +2 | +5 | 40<C<=43 |
| Step 3 | +3 | -2 | -2 | -3 | +4 | +3 | +5 | 43<C<=45 |
| Step 4 | +3 | -3 | -2 | -1 | +4 | +2 | +4 | 45<T<=48 |
| Step 5 | +4 | -3 | -1 | -2 | +4 | +3 | +6 | <=50 |
| Temperature | 49 | 46 | 44 | 45 | 42 | 40 | 47 | 49(Level5) |

FIG. 8D

| Level | High-speed PD(25W) | | High-speed PD(45W) | |
|---|---|---|---|---|
| | Input | Output | Input | Output |
| Normal(100) | 9V/2.77A | 8.76V/2.8A | 20V/2.25A | 8.76V/2.8A |
| Step 1(80) | 9V/2.77A | 8.76V/2.24A | 20V/2.25A | 8.76V/2.24A |
| Step 2(60) | 9V/2.77A | 8.76V/1.68A | 20V/2.25A | 8.76V/1.68A |
| Step 3(40) | 9V/2.77A | 8.76V/1.18A | 20V/2.25A | 8.76V/1.18A |
| Step 4(20) | 9V/2.77A | 8.76V/0.55A | 20V/2.25A | 8.76V/0.55A |
| Step 5(10) | 9V/2.77A | 8.76V/0.27A | 20V/2.25A | 8.76V/0.27A |

| Level | DC wire(68W) | | Normal wire(9W) | |
|---|---|---|---|---|
| | Input | Output | Input | Output |
| Normal(100) | 19V/3.42A | 8.76V/2.8A | 5V/1.8A | 8.76V/1.02A |
| Step 1(80) | 19V/3.43A | 8.76V/2.24A | 5V/1.8A | 8.76V/0.81A |
| Step 2(60) | 19V/3.44A | 8.76V/1.68A | 5V/1.8A | 8.76V/0.61A |
| Step 3(40) | 19V/3.45A | 8.76V/1.18A | 5V/1.8A | 8.76V/0.4A |
| Step 4(20) | 19V/3.46A | 8.76V/0.55A | 5V/1.8A | 8.76V/0.2A |
| Step 5(10) | 19V/3.47A | 8.76V/0.27A | 5V/1.8A | 8.76V/0.1A |

| Level | High-speed wire(15W) | |
|---|---|---|
| | Input | Output |
| Normal(100) | 9V/1.67A | 8.76V/1.71A |
| Step 1(80) | 9V/1.67A | 8.76V/1.37A |
| Step 2(60) | 9V/1.67A | 8.76V/1.02A |
| Step 3(40) | 9V/1.67A | 8.76V/0.68A |
| Step 4(20) | 9V/1.67A | 8.76V/0.34A |
| Step 5(10) | 9V/1.67A | 8.76V/0.34A |

FIG. 10

| Level | High-speed PD(25W) | | High-speed PD(45W) | |
|---|---|---|---|---|
| | Input | Output | Input | Output |
| Normal(100) | 9V/2.77A | 8.76V/2.8A | 20V/2.25A | 8.76V/2.8A |
| Step 1(80) | 9V/2.77A | 8.70V/2.24A | 20V/2.25A | 8.70V/2.24A |
| Step 2(60) | 9V/2.77A | 8.68V/1.68A | 20V/2.25A | 8.68V/1.68A |
| Step 3(40) | 9V/2.77A | 8.66V/1.18A | 20V/2.25A | 8.66V/1.18A |
| Step 4(20) | 9V/2.77A | 8.64V/0.55A | 20V/2.25A | 8.64V/0.55A |
| Step 5(10) | 9V/2.77A | 8.62V/0.27A | 20V/2.25A | 8.62V/0.27A |

| Level | DC wire(68W) | | Normal wire(9W) | |
|---|---|---|---|---|
| | Input | Output | Input | Output |
| Normal(100) | 19V/3.42A | 8.76V/2.8A | 5V/1.8A | 5/1.02A |
| Step 1(80) | 19V/3.43A | 8.70V/2.24A | 5V/1.8A | 8.70V/0.81A |
| Step 2(60) | 19V/3.44A | 8.68V/1.68A | 5V/1.8A | 8.68V/0.61A |
| Step 3(40) | 19V/3.45A | 8.66V/1.18A | 5V/1.8A | 8.66V/0.4A |
| Step 4(20) | 19V/3.46A | 8.64V/0.55A | 5V/1.8A | 8.64V/0.2A |
| Step 5(10) | 19V/3.47A | 8.62V/0.27A | 5V/1.8A | 8.62V/0.1A |

| Level | High-speed wire(15W) | |
|---|---|---|
| | Input | Output |
| Normal(100) | 9V/1.67A | 8.76V/1.71A |
| Step 1(80) | 9V/1.67A | 8.76V/1.37A |
| Step 2(60) | 9V/1.67A | 8.76V/1.02A |
| Step 3(40) | 9V/1.67A | 8.76V/0.68A |
| Step 4(20) | 9V/1.67A | 8.76V/0.34A |
| Step 5(10) | 9V/1.67A | 8.76V/0.17A |

FIG. 11

METHOD FOR CONTROLLING SURFACE HEAT GENERATION ELECTRONIC DEVICE AND STORAGE MEDIUM THEREFOR

CROSS-REFERENCE TO RELATED APPLICATIONS

This application is a bypass continuation application of International Application No. PCT/KR2022/015307, which was filed on Oct. 11, 2022, and is based on and claims priority to Korean Patent Application No. 10-2021-0163703, which was filed in the Korean Intellectual Property Office on Nov. 24, 2021, and Korean Patent Application No. 10-2021-0148142, which was filed in the Korean Intellectual Property Office on Nov. 1, 2021, the disclosures of which are incorporated by reference herein in their entireties.

BACKGROUND

Various embodiments of the disclosure relate to a method for controlling surface heat generation, an electronic device and a storage medium therefor.

An electronic device (e.g., a laptop computer) that the user may carry may provide substantially the same functions as those provided by a desktop computer. Accordingly, there is increasing demand for laptop computers for private or business use.

The electronic device may process a large amount of data to perform various functions and may consume more power, so it comes equipped with a large-capacity battery. Further, the capacity of chargers, typically measured in watts (W), for supplying power is also gradually increasing as faster charging is required for a large-capacity battery.

SUMMARY

As the use time of the electronic device gradually increases, current consumption inevitably increases due to an increase in data processing, and thus, heat generation increases and the temperature of the electronic device also increases. Further, when the electronic device is used in a state in which the high-power charger is connected to the electronic device, additional heat may be generated due to the charging.

As more heat is generated, heat generation on the surface of the electronic device, including around the battery, may also occur. For example, a laptop computer user may transfer input through a touchscreen, multiple keys, or a touchpad while touching the surface with his hand. If the touchpad or its surroundings are overheated, the user of the electronic device may feel uncomfortable.

Heat control may be performed to reduce or prevent heat generation in the electronic device. If the electronic device performs heat control to, e.g., the temperature determined by the manufacturer or determined in a one-sided manner to prevent over-heating, the overall performance of the electronic device may be degraded, and heat control optimized for the user may be hard to achieve.

Therefore, a need exists for a method capable of efficiently controlling the surface heat generation of the electronic device for smooth operation of the electronic device during charging.

Various embodiments of the disclosure may provide a method for controlling surface heat generation, an electronic device and a storage medium therefor.

According to various embodiments, an electronic device includes a housing, a battery, a charging circuit, a plurality of temperature sensors each disposed in a different positions within the housing, at least one processor operatively connected with the battery, the charging circuit, and the plurality of temperature sensors, and a memory. The memory storing instructions configured to, when executed, enable the electronic device to measure temperature values using one or more of the plurality of temperature sensors, in response to a temperature value associated with the battery being within a threshold value among the measured temperature values, calculate a predicted surface temperature based on at least one of the measured temperature values and a position of each temperature sensor, identify a control step among a plurality of control steps based on an operational state of at least one device associated with the electronic device and the predicted surface temperature, and adjust charging power for the battery through the charging circuit in response to the identified control step.

According to various embodiments, a method for controlling surface heat generation in an electronic device includes measuring temperature values using a plurality of temperature sensors, in response to a temperature value associated with a battery being within a threshold value among the measured temperature values, calculating a predicted surface temperature based on at least one of the measured temperature values and a position of each temperature sensor, identifying a control step among a plurality of control steps based on an operational state of at least one device associated with the electronic device and the predicted surface temperature, and adjusting charging power for the battery in response to the identified control step.

According to various embodiments, a non-transitory computer readable storage medium storing instructions, the instructions configured to be executed by at least one processor of an electronic device to enable the electronic device to perform at least one operation. The at least one operation including measuring temperature values using a plurality of temperature sensors, in response to a temperature value associated with a battery within a threshold value among the measured temperature values, calculating a predicted surface temperature based on at least one of the measured temperature values and a position of each temperature sensor, identifying a control step among a plurality of control steps based on an operational state of at least one device associated with the electronic device and the predicted surface temperature, and adjusting charging power for the battery in response to the identified control step.

According to various embodiments, the surface heat generation in the electronic device may be stepwise controlled, thereby minimizing self-performance restrictions due to heat generation and thus ensuring smooth operation performance and stable charging.

According to various embodiments, it is possible to prevent user discomfort due to skin contact by enabling control of surface heat generation of the electronic device.

According to various embodiments, it is possible to efficiently control the surface heat generation of the electronic device based on a heat generation control temperature calculated considering various conditions related to user activities (e.g., whether the input means is used, whether an external input device is used, whether the screen is turned on/off, whether an external display is connected, or whether communication is used) for the electronic device and the result of monitoring the temperatures of the components disposed in various positions in the electronic device when the electronic device is connected to a charger and used by the user.

According to various embodiments, it is possible to control surface heat generation even without using an expensive heat-dissipation material (e.g., heat pipe or fan) for dispersing heat and circuit complexity, thus reducing manufacturing costs of the electronic device.

Effects of the disclosure are not limited to the foregoing, and other unmentioned effects would be apparent to one of ordinary skill in the art from the following description.

BRIEF DESCRIPTION OF DRAWINGS

FIG. 8A is a view illustrating a method for obtaining a predicted surface temperature using a plurality of temperature sensors according to various embodiments;

FIG. 8B is a view illustrating a method for obtaining a final surface temperature at time T1 according to various embodiments;

FIG. 8C is a view illustrating a method for obtaining a final surface temperature at time T3 according to various embodiments;

FIG. 8D is a view illustrating a method for obtaining a final surface temperature at time T5 according to various embodiments;

FIG. 10 is a view illustrating stepwise charging current adjustment according to a charging scheme and a control step according to various embodiments; and FIG. 11 is a view illustrating stepwise charging voltage adjustment according to a charging scheme and a control step according to various embodiments.

The same or similar reference denotations may be used to refer to the same or similar elements throughout the specification and the drawings.

DETAILED DESCRIPTION

Figure 1:
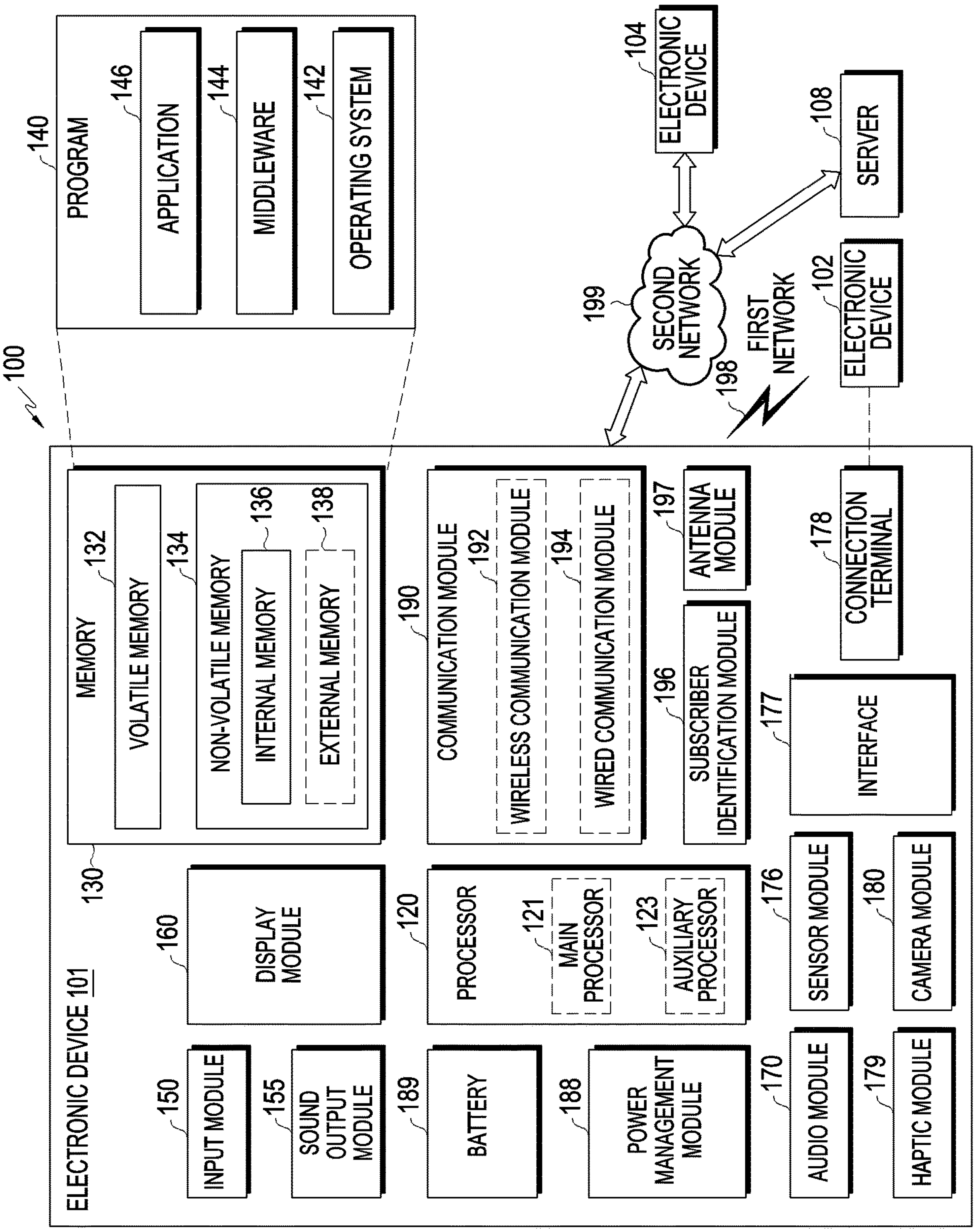
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

An example of an electronic device 200 is described below according to various embodiments.

Figure 2A:
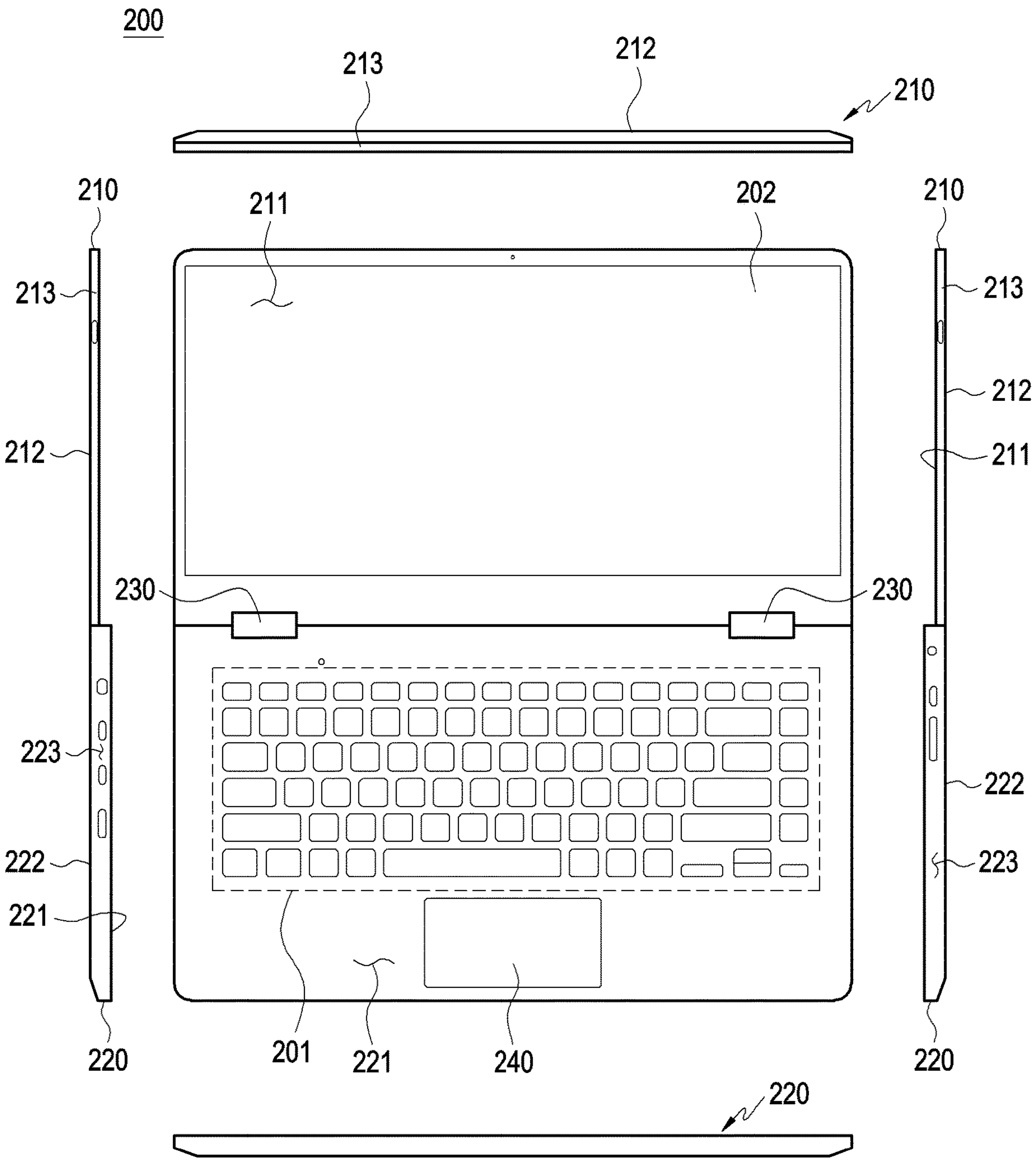
FIG. 2A is a view illustrating an example of an electronic device according to various embodiments.
Figure 2B:
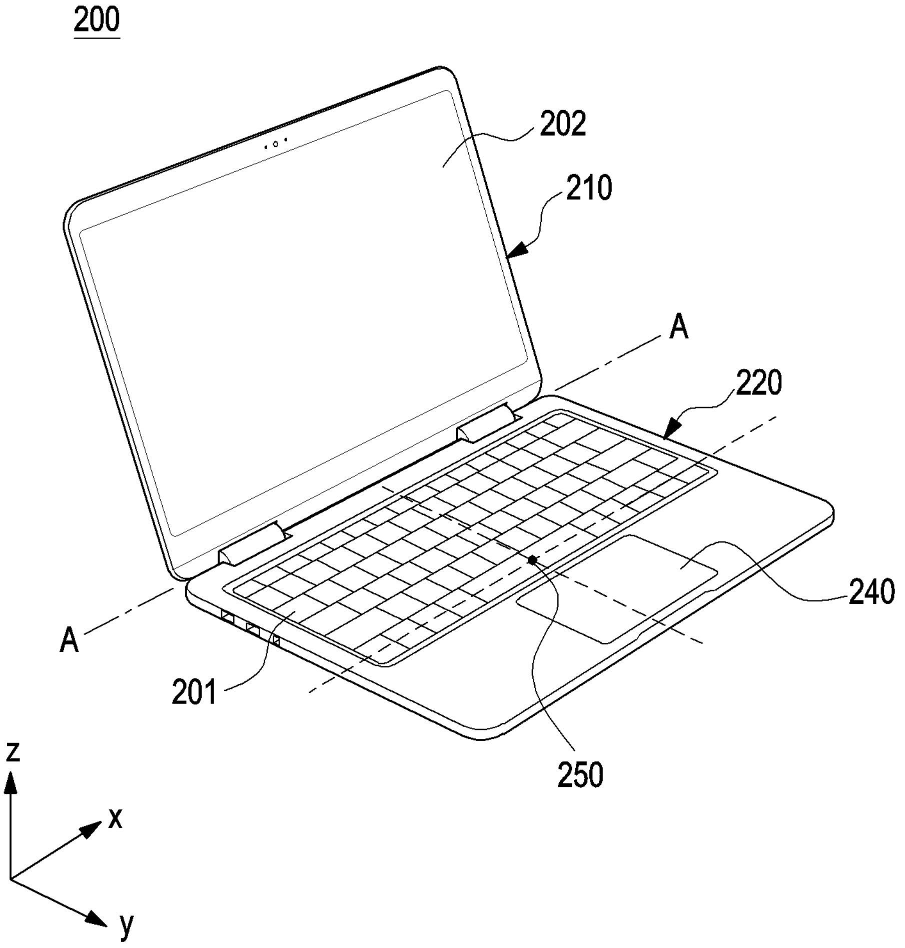
FIG. 2B is a perspective view illustrating an electronic device according to various embodiments.

FIG. 2A is a view illustrating an example of an electronic device 200 according to various embodiments. FIG. 2B is a perspective view illustrating an electronic device according to various embodiments.

According to various embodiments, the electronic device 200 may be various types of computers. For example, the electronic device 200 may include a laptop computer including a standard notebook, an Ultrabook, a netbook, and a tab book, a laptop computer, a tablet computer, and a desktop computer. Without being limited thereto, the electronic device 200 may be implemented as various types of electronic devices 200 including housings to be described below and a hinge 230 rotatably connecting the housings and having a plurality of keys 201 arranged on one housing. For example, the electronic device 200 may include a type of electronic device, such as a smart phone or a tab book.

According to various embodiments, as illustrated in FIGS. 2A and 2B, the electronic device 200 may include housings (e.g., a first housing 210 and a second housing 220) rotatably connected to each other and devices (e.g., a plurality of keys 201, a display 202, and a touchpad 240) disposed on each of the housings. Without being limited thereto, various types of devices (or hardware) may be disposed on or within the housings in FIGS. 2A and 2B. For example, the devices illustrated in FIG. 1 may be disposed on the (outer surfaces of) housings (e.g., first housing 210 and the second housing 220) or inside the housings (e.g., in an inner space formed by the outer surfaces). Hereinafter, the housings (e.g., the first housing 210 and the second housing 220) provided in the electronic device 200 and examples of the devices disposed on the housings are further described.

According to various embodiments, each of the plurality of housings (e.g., the first housing 210 and the second housing 220) may include a plurality of outer surfaces. For example, referring to FIGS. 2A and 2B, the plurality of outer surfaces of one housing (e.g., the first housing 210 or the second housing 220) may include a first surface 211 or 221 (or an upper surface), a second surface 212 or 222 (or a lower surface) facing away from the first surface 211 or 221, and third surfaces 213 or 223 (or side surfaces) positioned between the first surface 211 or 221 and the second surface 212 or 222 and connecting the first surface 211 or 221 and the second surface 212 or 222. The upper surface, the lower surface, and the side surface may be defined in an unfolded state of the housings (e.g., the first housing 210 and the second housing 220) as illustrated in FIG. 2A, but are not limited thereto. A predetermined space (not shown) may be formed inside one housing (e.g., the first housing 210 or the second housing 220) formed by the plurality of outer surfaces (e.g., the upper surface, lower surface, and side surfaces). Meanwhile, without being limited to those illustrated in FIG. 2A, the electronic device 200 may be implemented to include three or more housings.

According to various embodiments, the plurality of housings (e.g., the first housing 210 and the second housing 220) may be connected by a hinge 230 to be rotatable around the rotation axis in the direction A-A as shown in FIG. 2B. Without being limited to those illustrated in FIG. 2A, the hinge 230 may be implemented in various shapes and structures. For example, the hinge 230 may be implemented as a hinge 230 having an articulated structure. Further, without being limited to those described, the electronic device 200 may be implemented to include a structure for rotatably connecting various types of housings (e.g., the first housing 210 and the second housing 220) other than the above-described hinge 230. Each of the housings may rotate about the hinge 230. For example, if one housing (e.g., the first housing 210) is rotated in one direction (e.g., counterclockwise) about the hinge 230, an upper surface (e.g., 211) of the one housing (e.g., the first housing 210) and an upper surface (e.g., 221) of the other housing (e.g., the second housing 220) may face each other, and a lower surface (e.g., 212) of the one housing (e.g., the first housing 210) and a lower surface (e.g., 222) of the other housing (e.g., the second housing 220) may face in different directions. As another example, if the one housing (e.g., the first housing 210) is rotated about the hinge 230 in a different direction (e.g., clockwise), the upper surface (e.g., 211) of the one housing (e.g., the first housing 210) and the upper surface (e.g., 221) of the other housing (e.g., the second housing 220) may face in different directions from each other, and the lower surface (e.g., 212) of the one housing (e.g., the first housing 210) and the lower surface (e.g., 222) of the other housing (e.g., the second housing 220) may face each other.

Even when the other housing (e.g., the second housing 220) is rotated about the hinge 230, the respective surfaces of the housings (e.g., the first housing 210 and the second housing 220) may face in predetermined directions, as opposed to the case where the one housing (e.g., the first housing 210) is rotated. As at least a portion of the housings is rotated about the hinge 230, a predetermined folding angle may be formed between the housings (e.g., the first housing 210 and the second housing 220). For example, as illustrated in FIG. 2B, the folding angle between the upper surfaces of the housings (e.g., the first housing 210 and the second housing 220) may form an acute angle, an obtuse angle, a flat angle, or an angle larger than the flat angle.

According to various embodiments, devices (e.g., the display 202, the touchpad 240, and a plurality of keys 201) may be disposed on the outer surfaces (e.g., the upper surface, lower surface, or side surfaces) of one housing (e.g., the first housing 210 or the second housing 220) of the electronic device 200 and/or in a predetermined space formed by the outer surfaces.

According to an embodiment, as illustrated in FIG. 2A, the display 202 may be disposed on the one housing (e.g., the first housing 210). The display 202 may be a touchscreen including various sensors (e.g., a touch sensor or a pressure sensor) for sensing the user's input.

According to an embodiment, as illustrated in FIG. 2A, a plurality of keys 201 may be disposed on the other housing (e.g., the second housing 220) than the housing where the display 202 is disposed. Meanwhile, without being limited to those shown and/or described, various types of physical keys or electronic keys (e.g., a touchscreen on which electronic keys are displayed) other than the plurality of keys 201 of the keyboard may be implemented on the housing.

Further according to an embodiment, as shown in FIGS. 2A and 2B, the second housing 220 may further include the touchpad 240 for touch input in addition to the plurality of keys 201 as input devices.

Referring to FIG. 2B, according to an embodiment, the touchpad 240 may be disposed on the upper surface (e.g., 221) of the housing (e.g., the second housing 220) of the electronic device 200. As shown in FIG. 2B, the touchpad 240 may be disposed in a center area under the plurality of keys 201. According to another embodiment, the touchpad 240 may be disposed on the upper surface (e.g., 221) of the housing (e.g., the second housing 220) over the area where the plurality of keys 201 are disposed. However, the position in which the touchpad 240 is disposed is not limited thereto, but may be disposed in any position on the upper surface (e.g., 221) of the housing (e.g., the second housing 220). Further, although FIGS. 2A and 2B exemplify a rectangular touchpad 240, the touchpad 240 may be formed in various shapes, e.g., circular or oval shape.

Referring to FIGS. 2A and 2B, the user of the electronic device 200 may control the electronic device 200 by transferring input through the plurality of keys 201 and the touchpad 240. Since the plurality of keys 201 and the touchpad 240 are disposed on the upper surface (e.g., 221) of the housing (e.g., the second housing 220), the user may inevitably use the plurality of keys 201 and the touchpad 240 of the electronic device 200 with his hand in contact with the housing (e.g., the second housing 220). Further, if the user uses the electronic device 200 with a high-power charger connected thereto, heat may be generated by the charging process, and the generated heat may be transferred to the surface of the electronic device 200.

Therefore, it is needed to efficiently control the surface heat generation of the electronic device 200 in the state of contacting the skin during charging. According to various embodiments, when the user uses the electronic device 200 during charging, it is possible to control the surface heat generation by adjusting the charging power for the battery depending on whether the user uses the electronic device 200 while contacting the electronic device 200. In this case, the portion where surface heat generation control is performed for the electronic device 200 may be determined based on the surface which the user primarily contacts. For example, as shown in FIG. 2B, the center portion 250 of the electronic device 200 may be used as a reference point for heat generation control on the surface which the user contacts.

Figure 3:
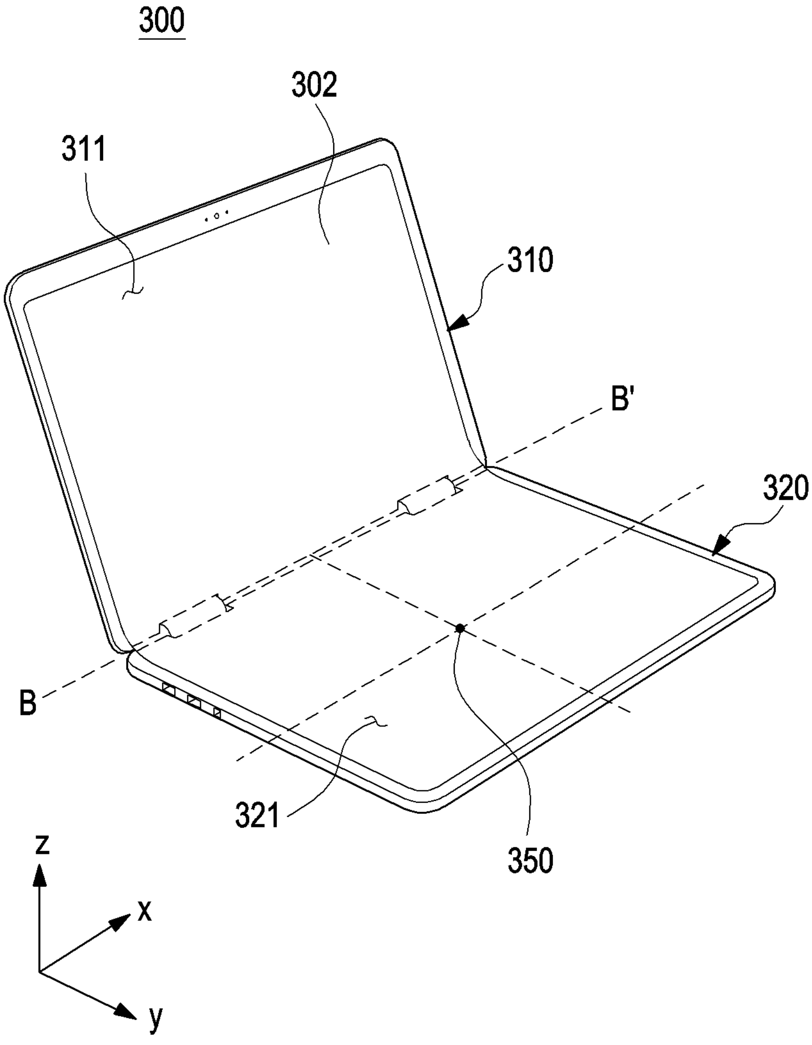
FIG. 3 is a perspective view illustrating a foldable electronic device including a flexible display according to various embodiments.

Meanwhile, the electronic device 200 in FIGS. 2A and 2B may be an electronic device 300 including a flexible display as shown in FIG. 3. However, embodiments are not limited thereto. The electronic device 200 may be configured to have a housing (e.g., the first housing 210 and the second housing 220) that is integrally formed or formed to be separable or couplable.

FIG. 3 is a perspective view illustrating a foldable electronic device including a flexible display according to various embodiments. The touchpad 340 is described in connection with FIG. 3 may have a configuration identical in whole or part to the touchpad 240 of FIGS. 2A and 2B, and no duplicate description is given.

Referring to FIG. 3, the foldable electronic device 300 may include a foldable housing 310 and 320. Here, the foldable housing 310 and 320 may include a first housing 310 and a second housing 320. The first housing 310 and the second housing 320 may be disposed on two opposite sides of the rotation axis B-B. The angle or distance between the first housing 310 and the second housing 320 may be varied depending on whether the foldable electronic device 300 is in the unfolded state, the folded state, or the partially unfolded (or partially folded) intermediate state. Here, the partially unfolded (or partially folded) intermediate state may be referred to as a folding state or a folding angle.

According to various embodiments, the display 302 (e.g., flexible display) may mean a display at least a portion of which may be transformed into a flat or curved surface. In an embodiment, the display 302 may include a first surface 311 (or a first display area) and a second surface 321 (or a second display area) about the rotation axis B-B, and the area of the display 302 may be divided with respect to the rotation axis B-B. As shown in FIG. 3, in the partially unfolded intermediate state based on the rotation axis B-B, the second housing 320 in the foldable electronic device 300 may contact the contact surface (e.g., floor or table), and the first housing 310 may stand on the contact surface.

According to various embodiments, as shown in FIG. 3, the touch panel may be included in the display 302 (e.g., flexible display), forming a layered structure.

According to an embodiment, in the partially unfolded (or partially folded) intermediate state, the touch panel may be operated as an input panel for the display 302. For example, the touch panel may be implemented as a touchscreen panel and, in the partially unfolded (or partially folded) intermediate state, it may be operated as an input panel for the first surface 311 (or first display area) in any position on the upper surface (e.g., 321) of the housing (e.g., the second housing 320). For example, a user input to the touchpad may be an input for controlling the object displayed on the display 302.

Meanwhile, as shown in FIG. 3, a center portion 350 of the housing (e.g., the second housing 320) of the electronic device 300 may be used as a reference point for heat generation control on the surface contacted by the user, but the position of the center portion 350 may not be limited thereto.

In the case of the electronic device 200 including the housing as shown in FIGS. 2A and 2B, more heat may be generated due to data processing during use, so that overheating may occur around the housing (e.g., the second housing 220) where main components are disposed. In particular, overheating due to charging may be transferred to the surface when the electronic device is used while being contacted by the user during charging.

Accordingly, the electronic device 200 may perform heat generation control with respect to the temperature of the battery during charging. Heat generation control during charging is described with reference to FIG. 4.

Figure 4:
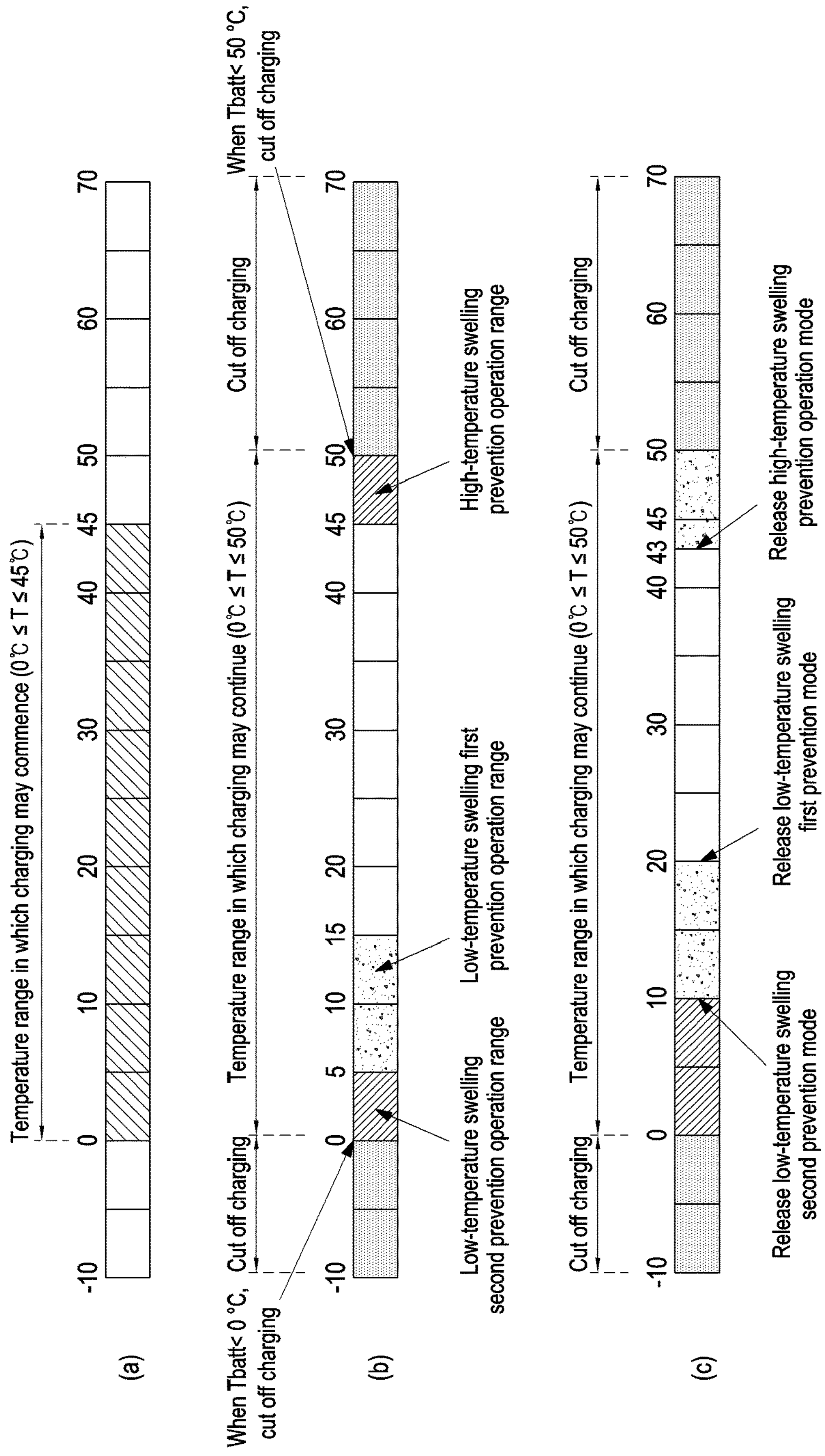
FIG. 4 is a view illustrating an allowable temperature for control during charging.

FIG. 4 is a view illustrating an allowable temperature for control during charging.

The allowable temperature (e.g., T) range for control during charging may be largely divided into a temperature range in a battery mode and a temperature range in a charging mode. All temperatures disclosed herein are measured in Celsius©. Here, the temperature range in the battery mode may mean a temperature range (e.g., 0 degrees to 45 degrees) in which charging may start, and the temperature range in the charging mode may mean a temperature range (e.g., 0 degrees to 50 degrees) in which charging may continue. For example, referring to FIG. 4(*a*), if the measured temperature before charging starts is a high temperature of 45 degrees or more, charging may not begin and, if the measured temperature is less than 0 degrees, charging may not commence. Accordingly, when the measured temperature falls in a temperature range less than 45 degrees and not less than 0 degrees, charging may commence.

Meanwhile, the temperature range in which charging started may continue may be as shown in FIG. 4(*b*). Referring to FIG. 4(*b*), the temperature range in which charging may continue means a temperature range allowable during charging. For example, when the measured temperature exceeds 50 degrees or is less than 0 degrees, charging may be cut off (or stopped). Such temperature range in which charging may continue is a temperature range for protecting the battery. Thus, if the measured temperature falls outside the temperature range (e.g., 0 degrees to 50 degrees), charging power is not supplied to the battery, thus preventing malfunction and swelling of the battery. Further, the electronic device 200 may perform a low-temperature swelling first prevention mode in a first low-temperature range (e.g., 5 degrees to 15 degrees), a low-temperature swelling second prevention mode in a second low-temperature range (e.g., 0 degrees to 5 degrees), and a high-temperature swelling prevention mode in a high-temperature range (e.g., 45 degrees to 50 degrees) to protect battery before cutting off charging. As such, it is possible to perform control to reduce charging current to prevent swelling for each of the respective prevention modes of the first low-temperature range, the second low-temperature range, and the high-temperature range.

Thereafter, the measured temperature is gradually decreased as the charging current is controlled. If normal changing control is immediately performed although the measured temperature falls in the temperature range (e.g., 0 degrees to 50 degrees) in which charging may continue, surface heat generation may be not actually addressed. Accordingly, if the measured temperature is less than, e.g., 0 degrees, and is then restored to 10 degrees or more as shown in FIG. 4(*c*), the electronic device 200 may release the low-temperature swelling second prevention mode and, if the measured temperature is gradually increased to 20 degrees or more, release the low-temperature swelling first prevention mode. In contrast, although the measured temperature exceeds 50 degrees and then restores to the range not less than 45 degrees and less than 50 degrees, if the measured temperature is decreased to less than, e.g., 43 degrees to further reduce the heat generation due to overheating, the electronic device 200 may release the high-temperature swelling prevention mode to thereby perform normal charging control.

As described above, only operations for protecting the battery, such as supplying or cutting off the charging current to the battery, are performed during charging. Thus, it is also required to control the surface heat generation due to data processing of the communication module or application processor as the user actually uses the electronic device 200. To prevent the transfer of the heat from surface heat generation to the user, a method of equipping an additional hardware component, such as a fan or a hit pipe, may be taken into consideration, but equipping an additional hardware component may increase the complexity of the circuit and material costs.

Further, if charging control is performed based on the temperature of the battery, battery swelling may be prevented, but it may be hard to actually control surface heat generation when using the electronic device 200. Further, if the operation of the electronic device 200 is limited based on the temperature of the application processor to reduce heat generation when using the electronic device 200, the heat generation temperature may be decreased, but performance may be lowered, so that user convenience may be decreased. Further, if charging is controlled in such a manner as to reduce high power of the variable charger, no heat generation occurs. However, since low power which is equal to or lower than the power consumed in the electronic device 200 is inputted, the battery is not charged, but rather discharge may occur even when the charger is connected to the electronic device 200. Therefore, a need exists for a method capable of efficiently controlling the surface heat generation of the electronic device for smooth operation of the electronic device during charging.

In the following description, it is needed to limit the heat generated on the surface of the electronic device when the user uses the electronic device during charging to a threshold temperature range. The heat generation control method is described in detail. A method for reducing the temperature of the heat generated on the surface may be to reduce the temperature by predicting the surface temperature using the temperature for components causing heat generation to control the power during charging. According to various embodiments, if the user uses the electronic device while contacting the electronic device at a high temperature of surface heat due to the heat generated from the main heat-generating components during charging, the user may experience discomfort. According to various embodiments, it is possible to reduce the surface temperature that the user feels, as well as to allow for continuous use of the electronic device by stepwise limiting the charging power depending on whether the user uses the electronic device while contacting the electronic device, as well as heat generated from the components during charging.

Heat generation control for the surface of the electronic device is described below in detail with reference to FIG. 5.

Figure 5:
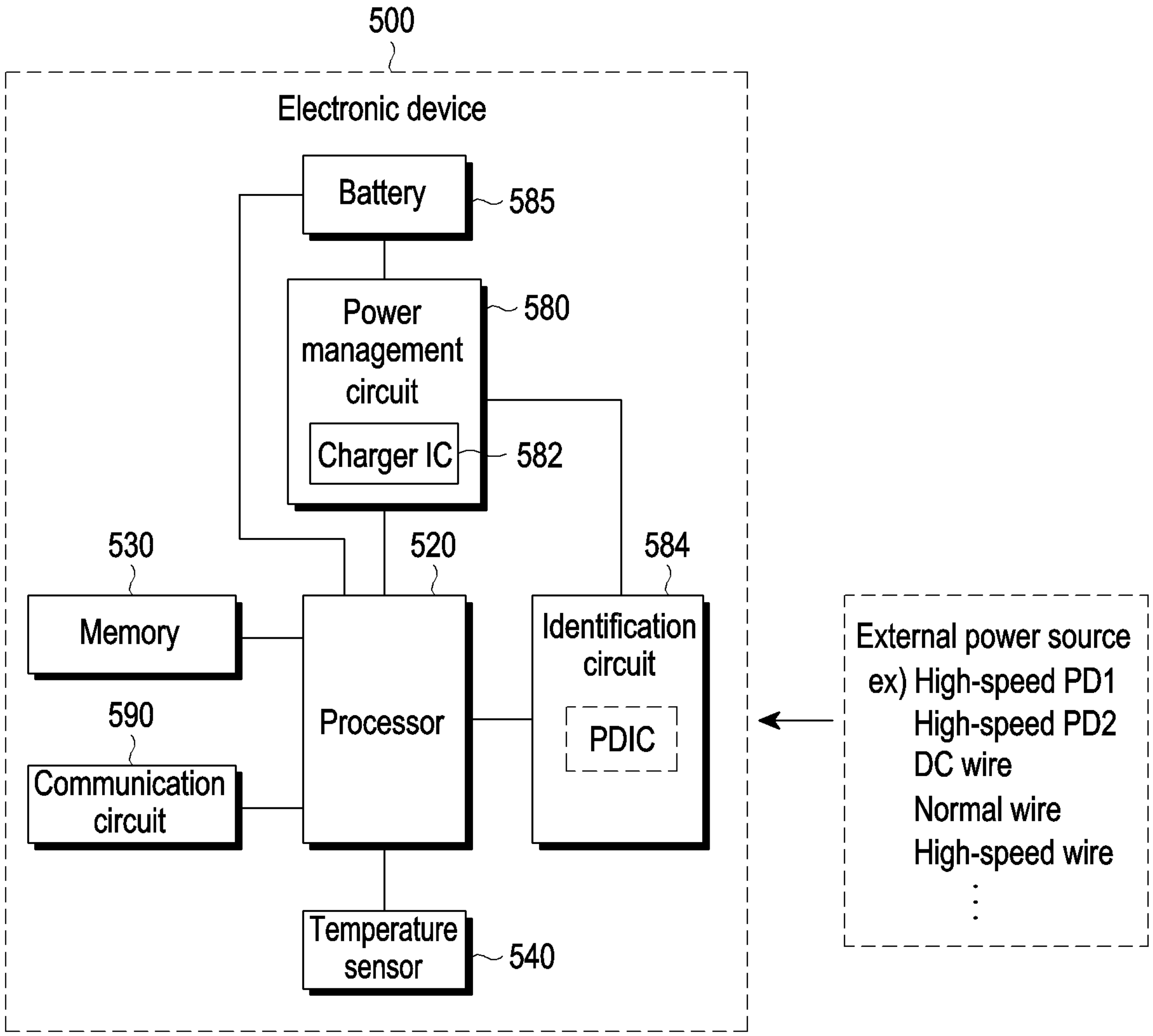
FIG. 5 is a block diagram illustrating an internal configuration of an electronic device for controlling surface heat generation according to various embodiments.

FIG. 5 is a block diagram illustrating an internal configuration of an electronic device for controlling surface heat generation according to various embodiments.

Referring to FIG. 5, the electronic device 500 may include various components in the housing and may include the whole or part of, e.g., the electronic device 101 of FIG. 1. The electronic device 500 may include one or more processors 520 (e.g., an application processor (AP)), a memory 530, a temperature sensor 540, a power management circuit 580, an identification circuit 584, a battery 585, and a communication circuit 590.

According to an embodiment, the electronic device 500 may omit at least one of the components or may add another component. The term “circuit” in the electronic device 500 in FIG. 5 denotes a unit processing at least one function or operation and be implemented in hardware, software, or a combination thereof. Although the term “circuit” is used in the electronic device 500, the term may be interchangeably used with “module,” “unit,” or “device.”

Referring to FIG. 5, the electronic device 500 may be connected with an external device through a connector (not shown). When the electronic device 500 is electrically connected with the external device through the connector, the electronic device 500 may receive power from the external device.

According to various embodiments, the charging circuit of the electronic device 500 may include a power management circuit (power management IC (PMIC)) 580 and an identification circuit 584. According to an embodiment, the charging circuit may be a separate component from the processor 520 and may be an integrated circuit of the power management circuit 580 and the identification circuit 584.

According to various embodiments, the power management circuit 580 (or the charger IC 582) may control the voltage of the power supplied to each component included in the electronic device 500. The power management circuit 580 may output a preset voltage. The power management circuit 580 may receive the power of the external device (e.g., a charger or battery pack) supplying external power through the connector and output a preset voltage and may charge the battery 585 electrically connected thereto. Although FIG. 5 exemplifies a case where the charger IC 582 is included in the power management circuit 580, the charger IC 582 may be implemented separately from the power management circuit 580 to supply and manage power to each of the battery 585 and the power management circuit 580.

According to various embodiments, the processor 520 may control the operation of the electronic device 500 and/or the signal flow between the components of the electronic device 500 and perform a data processing function of processing data. When attached with the external device, the processor 520 may recognize it through an interrupt signal line connected with the identification circuit 584.

According to various embodiments, the memory 530 may be electrically connected to the processor 520 and may store various pieces of information and programs necessary to control the surface heat generation temperature of the electronic device 500 during charging according to various embodiments. For example, the program may include a routine for detecting connection with the external device for charging, a routine for identifying the type of the external device when connected with the external device, a routine for charging to correspond to the identified external device, a routine for checking heat generation for the components which are heat generation sources during charging, a routine for predicting surface temperature when heat of a threshold temperature or more is generated, a routine for determining the final surface temperature reflecting the user’s usability of the electronic device 500 to the predicted surface temperature, and a routine for controlling the charging power in response to the final surface temperature.

Further, when heat within a threshold temperature or more is generated during charging, a notification may be provided through the display of the electronic device 500, and commands (instructions) for stepwise changing the charging power of the electronic device 500 may be previously stored in the memory 530.

According to various embodiments, the identification circuit 584 may include at least one of a micro-usb interface controller (MUIC), a cable and connector integrated chip (CCIC), or a power delivery integrated chip (PDIC).

The identification circuit 584 may identify whether the electronic device is attached with the external device connected through the connector and the type of the external device. According to an embodiment, the identification circuit 584 may identify the value detected through the connector and may identify whether it is attached (or connected) to or detached (or disconnected) from the external device 420 depending on the detected value. Specifically, the identification circuit 584 determines the type of the attached external device based on the detected value (e.g., resistance value, voltage value, current value, or impedance value) for the connector (e.g., identification terminal). For example, the identification circuit 584 may identify the voltage applied through the connector (e.g., power terminal), such as 9V/2.77 A for 25 W high-speed PD, 20V/2.25 A for 45 W high-speed PD, 19V/3.42 A for 68 W DC wire, 5V/1.8 A for 9 W normal wire, or 9V/1.67 A for 15 W high-speed wire. The value detected through the connector may mean a voltage currently applied to the electronic device 500. Although 'voltage' is exemplified for the purpose of describing various embodiments, 'voltage' may be interchangeably used with 'current,' 'power,' or 'impedance.'

As described above, the electronic device 500 may obtain various variable input power sources and may use the identification circuit 584 to identify the type of power input through the connector. Since the value detected depending on the type of the attached external device (or the type of power supplied) differs, the identification circuit 584 may identify the magnitude of the voltage supplied from the external device based thereupon, so that the battery 585 may be charged with the power supplied from the external device through the power management circuit 580.

According to various embodiments, the communication circuit 590 may be the same as the communication circuit described above in the communication circuit 190 of FIG. 1. According to an embodiment, the communication circuit 590 may include a first communication circuit, a second communication circuit, or/and a third communication circuit. According to an embodiment, the first communication circuit may perform communication in a first communication scheme through at least a portion of the antenna module, and the second communication circuit may perform communication in a second communication scheme through at least a portion of the antenna module. According to an embodiment, the first communication scheme may be a 5G (or new radio (NR)) communication protocol-based communication scheme, and the second communication scheme may be a 4G (or LTE) communication protocol-based communication scheme. According to an embodiment, the third communication circuit may be a short-range wireless communication circuit and may perform short-range wireless communication. For example, the short-range wireless communication circuit may be a Wi-Fi communication circuit.

According to various embodiments, the temperature sensor 540 may include a plurality of temperature sensors. The temperature sensor 540 may be a plurality of thermistors disposed inside the electronic device 500. The temperature sensor 540 may output a temperature value according to a resistance value that varies depending on temperature, or a temperature value according to the resistance value may be identified by the processor 520. According to an embodiment, the temperature sensor 540 may be disposed in a position corresponding to or adjacent to one of the components (e.g., a component serving as a main heat source) included in the electronic device 500. For example, the temperature sensor 540 may be disposed in an area adjacent to at least one of the components, such as the processor 520, the power management circuit 580, the battery 585, and the communication circuit 590. According to an embodiment, the electronic device 500 may further include other various components including a sub printed circuit board (PCB) (not shown) or a housing in addition to the above-described components of the electronic device 500. The temperature sensor 540 may be further disposed adjacent to each of other various components, such as an input module (e.g., USB) or audio module. According to an embodiment, the temperature sensor 540 may be operated under the control of the processor 520. The temperature sensor 540 may passively transfer the state corresponding to the temperature value in response to the command from the processor 520 and, in response thereto, the processor 520 may obtain the temperature associated with at least one component of the electronic device 500 from the temperature sensor 540. According to an embodiment, the temperature sensor 540 may provide the temperature value obtained in the position corresponding to at least one heat source (e.g., at least one component designated as a heat source) among the components included in the electronic device 500.

According to various embodiments, the processor 520 may obtain the heat generation temperature (or surface heat generation temperature) of the electronic device 500 based on the temperature value obtained using the temperature sensor 540 during charging. For example, the processor 520 may obtain the heat generation temperature of the electronic device 500 by identifying the temperature value (or temperature values) detected by the temperature sensor 540 in real-time or periodically according to a designated period when charging is started or may obtain the heat generation temperature using an algorithm (e.g., linear regression analysis algorithm) stored to predict the surface heat generation temperature and the temperature value according to the temperature sensor 540. According to an embodiment, when there are a plurality of temperature sensors 540, the processor 520 may obtain the heat generation temperature using temperature values from the plurality of temperature sensors disposed adjacent to respectively correspond to the components of the electronic device 500 or obtain the heat generation temperature predicted through learning considering the operation type of the electronic device 500 and the temperature values from the plurality of temperature sensors.

According to an embodiment, the processor 520 may use the temperature sensor associated with the battery 585 among the plurality of temperature sensors 540 to protect the battery 585 during charging and to maintain charging. For example, the processor 520 may identify the charging temperature range by the temperature sensor associated with the battery 585.

According to an embodiment, if the temperature value by the temperature sensor associated with the battery 585 falls outside the temperature range (e.g., less than 0 degrees or more than 50 degrees) in which charging may continue as shown in FIG. 4(*b*), the processor 520 may control charging using only the temperature sensor associated with the battery 585. For example, the processor 520 may perform the operation of cutting off or resuming charging based on the temperature value by the temperature sensor associated with the battery 585.

According to an embodiment, if the temperature value by the temperature sensor associated with the battery 585 is within a threshold value or falls within a threshold range (e.g., not less than 0 degrees and less than 50 degrees), the processor 520 may perform heat generation control using the temperature values of all the temperature sensors disposed in other positions as well as the temperature sensor associated with the battery 585. Here, the threshold value is a threshold value different from the threshold value meaning an excess temperature and may mean a charging threshold value.

According to an embodiment, since the temperature range in which power control for surface heat generation is possible, the temperature value by the temperature sensor associated with the battery 585, is, e.g., not less than 0 degrees or less than 50 degrees, heat generation control may be performed using the temperature values of all the temperature sensors disposed in different positions as well as the temperature sensor associated with the battery 585. In contrast, if the temperature value by the temperature sensor associated with the battery 585 falls outside the threshold range, e.g., if the measured temperature is more than 50 degrees or less than 0 degrees as shown in FIG. 4(*b*), the temperature value falls outside the temperature range allowable during charging. In such a case, protection of the battery should be prioritized. Thus, a charging control operation of stopping (or cutting off) charging to prevent supply of charging power to the battery or releasing the cutoff of charging may be performed rather than controlling surface heat generation. As such, power control for surface heat generation using a plurality of temperature sensors during charging may be performed while the temperature value by the temperature sensor associated with the battery 585, first among the measured temperature values, falls within the temperature range allowable during charging. By doing so, malfunction and swelling of the battery may be prevented.

As described above, as a condition for collecting multiple temperature sensor data (or multiple temperature values) using the plurality of temperature sensors, the temperature value of the temperature sensor associated with the battery 585 may be used as a reference.

According to various embodiments, the processor 520 may measure a change in temperature in each position of the electronic device 500 in real-time based on the multiple temperature sensor data. The processor 520 may predict the temperature transferred to the surface based on the change in temperature in the corresponding position. The processor 520 may predict the surface temperature based on the multiple temperature sensor data measured at a designated period.

According to an embodiment, the processor 520 may collect the temperature values measured by the respective temperature sensors 540 and calculate the predicted surface temperature using Equation 1 and the collected temperature values.

predicted surface temperature=[temperature sensor measurement average]*[distance to center point] [Equation 1]

In Equation 1 above, the temperature sensor measurement average may be the average measurement for the temperature values for a predetermined time at each temperature sensor, and the distance to the center point may be the distance from the center point (e.g., 250 of FIG. 2B) of the electronic device 500 to the position of the corresponding temperature sensor. Here, the center point may be regarded as the center of heat generation of the electronic device 500. For example, the center portion of the electronic device 500, corresponding to the surface mainly contacted by the user while using the electronic device 500, may be regarded as the center point for heat generation control.

In one embodiment, the temperature sensor measurement average is an average of the remaining temperature values except for the maximum and minimum values among the temperature values for the predetermined time. For example, the average of the ten temperature values, except for the maximum and minimum values, obtained every interval of time T (e.g., one minute) may be regarded as the average measurement.

The processor 520 may determine that the maximum value among the values obtained by multiplying the average measurement for each temperature sensor by the distance from the center position (e.g., 250 of FIG. 2B) of the electronic device 500 is the predicted surface temperature.

According to various embodiments, the processor 520 may determine a heat generation control step among a plurality of heat generation control steps based on the predicted surface temperature. According to an embodiment, a different predicted surface temperature range may be set to each control step. Accordingly, the processor 520 may determine the heat generation control step depending on which control step of temperature range the calculated predicted surface temperature belongs to.

According to various embodiments, the processor 520 may additionally adjust the heat generation control step depending on whether the user is actually contacting the electronic device 500 while using the electronic device 500.

According to an embodiment, the processor 520 may determine the final control step by adjusting the control step based on the operational state of at least one device associated with the electronic device 500. According to an embodiment, the processor 520 may identify whether the user is using the electronic device 500 depending on the operational state of an internal device of the electronic device 500 or an external device connected with the electronic device 500. For example, when the user uses such an external device as an external keyboard or external display, the risk of user discomfort is low whereas when the user uses such an internal device as a keyboard, the risk of user discomfort is high due to the user's direct contact to the surface.

According to various embodiments, the processor 520 may identify the operational state of at least one device associated with the electronic device 500 based on a user activity event (e.g., usability information) and may accordingly determine whether the user is in contact with the surface of the electronic device 500. For example, the processor 520 may receive an event according to use of the keyboard (or keypad or touchpad) through an input module (e.g., the input module 150 of FIG. 1).

According to various embodiments, the processor 520 may adjust the predicted control step using the parameter value corresponding to the operational state of at least one device associated with the electronic device and the predicted surface temperature calculated based on the maximum value. For example, the processor 520 may adjust the predicted control step by predicting the control step by the calculated predicted surface temperature and then applying the parameter value corresponding to each operational state to the predicted surface temperature and may finally determine the heat generation control step. According to an embodiment, the adjustment of the heat generation control step may be performed every designated period (e.g., the T time interval) but, to reduce loads due to frequent temperature control, may be performed in a longer period than the designated period.

According to various embodiments, the processor 520 may decrease the surface temperature through power control corresponding to the heat generation control step. Accordingly, the processor 520 may control heat generation so that the heat generation temperature of the electronic device 500 does not exceed the heat generation temperature threshold. According to an embodiment, the processor 520 may stepwise limit the power supplied to the battery 585 of the electronic device 500 according to the control step to reduce the heat generation temperature.

According to various embodiments, an electronic device (e.g., the electronic device 200 of FIGS. 2A and 2B or the electronic device 500 of FIG. 5) includes a housing (e.g., the first housing 210 and the second housing 220), a battery 585, a charging circuit (e.g., the power management circuit 580 and the identification circuit 584), a plurality of temperature sensors 540 each disposed in a different positions within the housing, at least one processor 520 operatively connected with the battery, the charging circuit, and the plurality of temperature sensors, and a memory 530. The memory 530 stores instructions configured to, when executed, enable the electronic device to measure temperature values using one or more of the plurality of temperature sensors 540, in response to a temperature value associated with the battery 585 within a threshold value, calculate a predicted surface temperature based on at least one of the measured temperature values and a position of each temperature sensor, identify a control step among a plurality of control steps based on an operational state of at least one device associated with the electronic device 500 and the predicted surface temperature, and adjust charging power for the battery 585 through the charging circuit in response to the identified control step.

According to various embodiments, the instructions may be configured to enable the electronic device to calculate the predicted surface temperature based on a maximum value among values obtained by multiplying an average measurement for each of the measured temperature values by the distance from the center position of the electronic device corresponding to a heat generation center point.

According to various embodiments, the instructions may be configured to enable the electronic device to predict a control step among the plurality of control steps based on a predicted surface temperature calculated based on the maximum value.

According to various embodiments, the instructions may be configured to enable the electronic device to identify the control step by adjusting the predicted control step based on the operational state of the at least one device associated with the electronic device.

According to various embodiments, the instructions may be configured to enable the electronic device to adjust the predicted control step, using a parameter value corresponding to the operational state of the at least one device associated with the electronic device and the predicted surface temperature calculated based on the maximum value.

According to various embodiments, the instructions may be configured to enable the electronic device to identify whether the electronic device is attached with an external device for charging and, in response to the attachment with the external device, measure the temperature values using the plurality of temperature sensors at the designated period.

According to various embodiments, the instructions may be configured to enable the electronic device to adjust charging power for the battery through the charging circuit, in response to the identified control step, based on initial power from the attached external device.

According to various embodiments, the instructions may be configured to enable the electronic device to decrease a charging current for the battery in a constant current range, in response to the identified control step.

According to various embodiments, the instructions may be configured to enable the electronic device to decrease a charging voltage for the battery in a constant voltage range, in response to the identified control step.

According to various embodiments, the at least one device associated with the electronic device may include an internal device of the electronic device or an external device connected with the electronic device.

According to various embodiments, the internal device of the electronic device may include at least one of a keyboard, a display, and communication circuitry. The external device connected with the electronic device may include at least one of an external keyboard or an external display.

According to various embodiments, the housing may include a first housing including a first surface and a second surface facing in a direction opposite to a direction in which the first surface faces, a second housing including a third surface corresponding to the first surface of the first housing and a fourth surface facing in a direction opposite to a direction in which the third surface faces, and a hinge rotatably connecting the first housing and the second housing. The electronic device may further comprise a display disposed on the first surface of the first housing and a keypad disposed on the third surface of the second housing.

Figure 6:
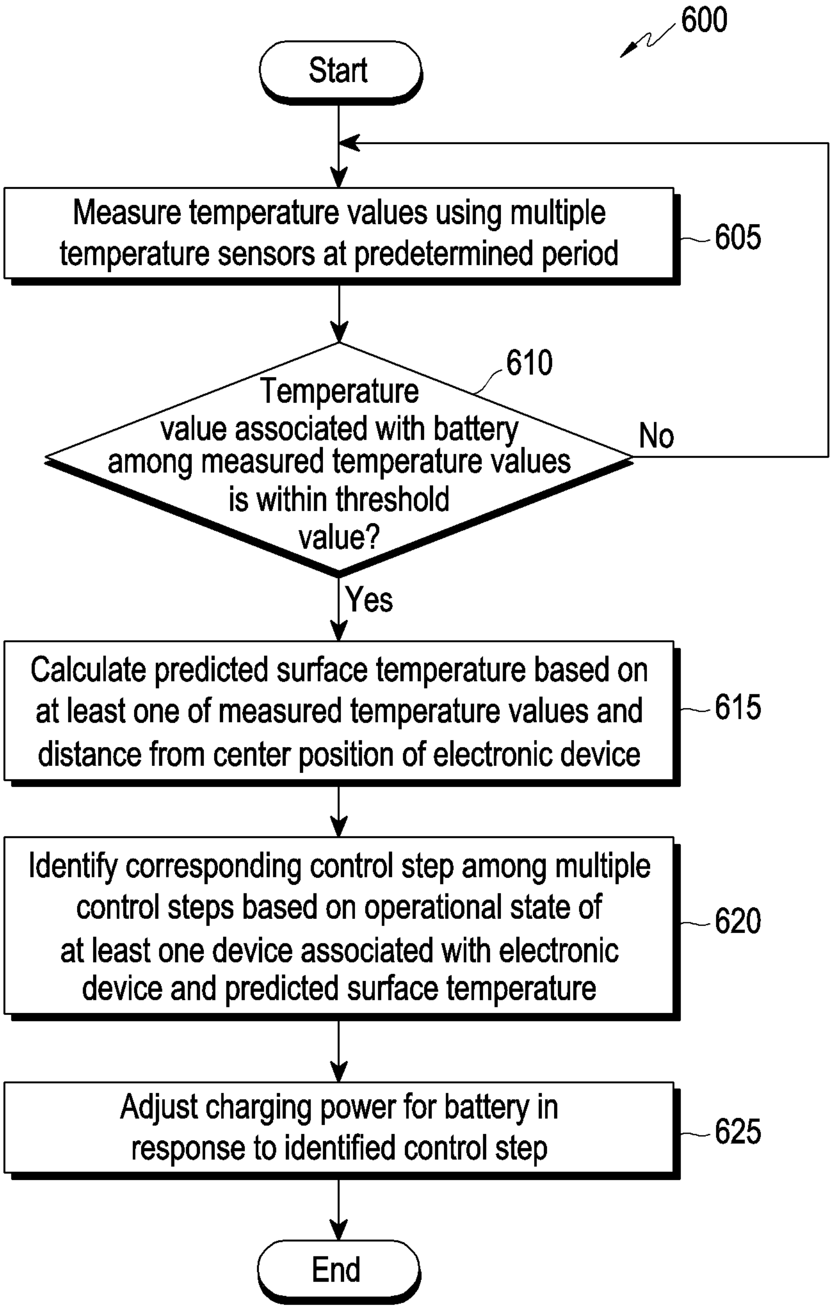
FIG. 6 is a flowchart illustrating operations for controlling surface heat generation in an electronic device according to various embodiments.

FIG. 6 is a flowchart 600 illustrating operations for controlling surface heat generation in an electronic device according to various embodiments.

Referring to FIG. 6, the operation method may include operations 605 to 625. Each step/operation of the operation method of FIG. 6 may be performed by an electronic device (e.g., the electronic device 101 of FIG. 1, the electronic device 200 of FIGS. 2A and 2B, or the electronic device 500 of FIG. 5) or at least one processor (e.g., at least one of the processor 120 of FIG. 1 or the processor 520 of FIG. 5) of the electronic device.

In operation 605, the electronic device 500 may measure temperature values using a plurality of temperature sensors at a designated period.

According to various embodiments, the operation of measuring the temperature values using the plurality of temperature sensors may include the operation of identifying whether the electronic device is attached with an external device for charging and the operation of measuring the temperature values using the plurality of temperature sensors at the designated period in response to attachment with the external device.

In operation 610, the electronic device 500 may identify whether the temperature value associated with the battery among the measured temperature values is within a threshold value.

In response to when the temperature value associated with the battery among the measured temperature values is within the threshold value, in operation 615, the electronic device 500 may calculate the predicted surface temperature based on at least one of the measured temperature values and the distance from the center position of the electronic device 500 to a position of each temperature sensor.

According to various embodiments, the operation of calculating the predicted surface temperature may include the operation of calculating the predicted surface temperature based on the maximum value among the values obtained by multiplying the average measurement for each of the measured temperature values by the distance from the center position of the electronic device corresponding to the heat generation center point.

In operation 620, the electronic device 500 may identify a control step among the plurality of control steps based on the operational state of at least one device associated with the electronic device and the predicted surface temperature.

According to various embodiments, the operation of identifying the control step among the plurality of control steps may include the operation of predicting the control step among the plurality of control steps based on the predicted surface temperature calculated based on the maximum value and the operation of identifying the control step by adjusting the predicted control step based on the operational state of at least one device associated with the electronic device.

According to various embodiments, the operation of identifying the control step may include the operation of adjusting the predicted control step using the parameter value corresponding to the operational state of at least one device associated with the electronic device and the predicted surface temperature calculated based on the maximum value.

In operation 625, the electronic device 500 may adjust the charging power for the battery in response to the identified control step.

According to various embodiments, the operation of adjusting the charging power for the battery in response to the identified control step may include the operation of decreasing the charging current for the battery in a constant current range, in response to the identified control step, based on the initial power from the attached external device.

According to various embodiments, the operation of adjusting the charging power for the battery in response to the identified control step may include the operation of decreasing the charging voltage for the battery in a constant voltage range in response to the identified control step, based on the initial power from the attached external device.

According to various embodiments, the method may include, in response to a determination that the temperature value associated with the battery being is outside a threshold range, operation of determining a difference between the temperature value and a cutoff of the threshold range, based on a determination that the difference exceeds a maximum value, operation of stopping charging of the battery.

According to various embodiments, the method may include, based on a determination that the difference is less than the maximum value, operation of decreasing the charging power for the battery.

According to various embodiments, wherein at least one of the plurality of temperature sensors is disposed adjacent to the battery and at least one of the plurality of temperature sensors is disposed adjacent to the at least one processor.

Figure 7:
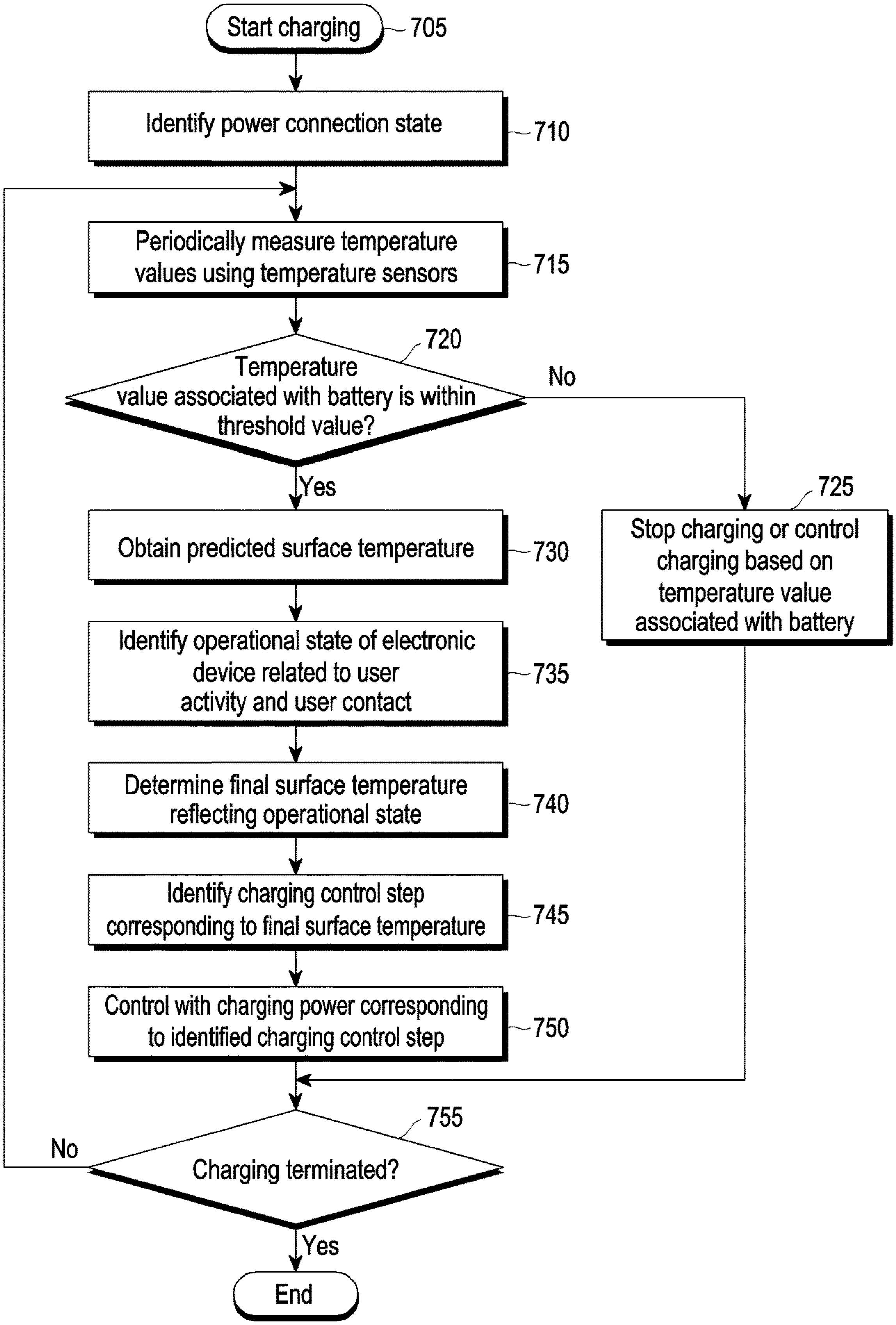
FIG. 7 is a flowchart illustrating detailed operations for controlling surface heat generation in an electronic device according to various embodiments.

FIG. 7 is a flowchart illustrating detailed operations for controlling surface heat generation in an electronic device according to various embodiments. To aid understanding of FIG. 7, the description is made with reference to FIGS. 8A to 8D. FIG. 8A is a view illustrating a method for obtaining a predicted surface temperature using a plurality of temperature sensors according to various embodiments. FIG. 8B is a view illustrating a method for obtaining a final surface temperature at time T1 according to various embodiments. FIG. 8C is a view illustrating a method for obtaining a final surface temperature at time T3 according to various embodiments. FIG. 8D is a view illustrating a method for obtaining a final surface temperature at time T5 according to various embodiments.

If charging commences (705), the electronic device 500 may identify the power connection state in operation 710. According to an embodiment, the electronic device 500 may identify whether it is attached with an external device through the connector and identify the initial power provided from the attached external device. For example, the initial power, such as 9V/2.77 A for 25 W high-speed PD, 20V/2.25 A for 45 W high-speed PD, 19V/3.42 A for 68 W DC wire, 5V/1.8 A for 9 W normal wire, or 9V/1.67 A for 15 W high-speed wire, is inputted, and the electronic device 500 may start charging the battery 585 based on the initially inputted power.

In operation 715, the electronic device 500 may periodically measure the temperature value using temperature sensors. According to an embodiment, the electronic device 500 may measure the temperature values using each temperature sensor periodically (e.g., period T) as shown in FIG. 8A.

In operation 720, the electronic device 500 may identify whether the temperature value associated with the battery is within a threshold value. If the temperature value associated with the battery 585 is not within the threshold value, e.g., more than 50 degrees or less than 0 degrees, it falls outside the temperature range allowable during charging. Thus, in operation 725, the electronic device 500 may perform charging control to decrease the battery overheat temperature or stop charging based on the temperature value associated with the battery 585 and, after charging control, perform operation 755. For example, if the temperature value by the temperature sensor associated with the battery 585 falls outside the temperature range (e.g., less than 0 degrees or more than 50 degrees) in which charging may continue, the electronic device 500 may control charging using only the temperature sensor associated with the battery 585. For example, the electronic device 500 may perform the operation of cutting off or resuming charging based on the temperature value by the temperature sensor associated with the battery 585. In one embodiment, the determination to either stop charging the battery or perform charging control to decrease the battery overheat temperature is based on an amount that the temperature value associated with the battery 585 is outside the threshold value. For example, if the temperature value associated with the battery 585 is within five degrees of the threshold value, decreasing a charging power for the battery. However, if the temperature value associated with the battery 585 is more than five degrees different than the threshold value, charging of the battery 585 is stopped.

If the temperature value associated with the battery 585 is within the threshold value, the electronic device 500 may obtain the predicted surface temperature in operation 730. When the temperature value by the temperature sensor associated with the battery 585, is, e.g., not less than 0 degrees or less than 50 degrees, the electronic device 500 may perform heat generation control using the temperature values of all the temperature sensors disposed in different positions as well as the temperature sensor associated with the battery 585.

Referring to FIG. 8A, the plurality of temperature sensors may include at least one of an AP thermistor AP_THM measuring the temperature for the processor 520, a charging thermistor CHG_THM measuring the temperature for the charging circuit, a USB thermistor USB_THM measuring the temperature of the external input device, a Wi-Fi thermistor WIFI_THM measuring the temperature of the Wi-Fi module, a PAM_THM measuring the temperature of the RF module, and a battery thermistor BAT_THM measuring the temperature of the battery 585. It may be seen that at time T1, the temperature value measured by the PAM_THM measuring the temperature for the RF module among the plurality of measured temperature values is highest. Here, the measured temperature value of 40 may be the average of the temperature values measured by the PAM_THM during the time T1. Accordingly, the electronic device 500 may calculate 40, which is the temperature value measured by the PAM_THM corresponding to the highest value, i.e., maximum value, among the respective average measurements of the temperature sensors, as the predicted surface temperature. The electronic device 500 may calculate 42, which is the temperature value measured by the charging thermistor CHG_THM corresponding to the maximum value among the respective average measurements of the temperature sensors, as the predicted surface temperature at time T2. As described above, the electronic device 500 may predict the average measurement corresponding to the maximum value as the heat generation temperature for the surface of the electronic device 500, every designated period.

After obtaining the predicted surface temperature, the electronic device 500 may identify the operational state of the electronic device 500 related to the user activity and user contact in operation 735. In operation 740, the electronic device 500 may determine the final surface temperature reflecting the operational state. In operation 745, the electronic device 500 may identify the charging control step corresponding to the final surface temperature.

This is described in detail with reference to FIGS. 8B to 8D.

FIG. 8B exemplifies a method for determining the final surface temperature based on the predicted surface temperature at time T1 of FIG. 8A. Referring to FIG. 8B, the electronic device 500 may determine the final surface temperature by adding/subtracting the parameter value according to the operational state of the electronic device 500 to/from the temperature value of each temperature sensor based on the predicted surface temperature and determine the control step corresponding to the final surface temperature.

If the predicted surface temperature at time T1 is assumed to be 40 degrees as described in connection with FIG. 8A, the electronic device 500 may determine the first chamfered surface among the plurality of control steps by applying the parameter value according to the operational state of the external device connected with the electronic device or the internal device associated with the electronic device 500 to the predicted surface temperature.

According to an embodiment, a different predicted surface temperature range may be set to each control step. As shown in FIG. 8B, control step 0 may correspond to a predicted surface temperature range not more than 38 degrees, control step 1 may correspond to a predicted surface temperature range more than 38 degrees and not more than 40 degrees, control step 2 may correspond to a predicted surface temperature range more than 40 degrees and not more than 43 degrees, control step 3 may correspond to a predicted surface temperature range more than 43 degrees and not less than 45 degrees, control step 4 may correspond to a predicted surface temperature range more than 45 degrees and not more than 48 degrees, and control step 5 may correspond to a predicted surface temperature range not more than 50 degrees.

Accordingly, the predicted surface temperature of 40 degrees at time T1 in FIG. 8A is predicted as control step 1 but, if the parameter value according to the operational state of the electronic device 500 in FIG. 8B is added/subtracted, the final surface temperature may be varied, so that control step 1 may be adjusted to the control step corresponding to the final surface temperature. As described above, the electronic device 500 may determine the heat generation control step depending on which control step of temperature range the final surface temperature belongs to according to the use of the electronic device 500.

For example, referring to FIG. 8B, the parameter value for the control step corresponding to the predicted surface temperature may be applied to the predicted surface temperature depending on whether the user is using the keyboard in the electronic device 500 at time T1, whether the user is using an external input device (e.g., USB-, Wi-Fi-, or BT-type keyboard), whether the user is using the display, whether the user connects an external display and is using it, whether the user is using the communication circuit (e.g., LTE/5G), whether the user is using the Wi-Fi module, or whether it is being charged. For example, when the parameter value (+2) is applied to the predicted surface temperature of 40 degrees when the keyboard is activated, the temperature becomes 42 degrees and, if the external input device is used, the risk of user discomfort is decreased. Thus, the parameter value (−2) is applied to the predicted surface temperature of 40 degrees, so that the temperature may become 38 degrees. Further, as the temperature of the display, the temperature of the AP thermistor AP_THM may be used. Whether the display is used may be known using the temperature of the AP thermistor. The parameter value (−1) may be applied at the temperature of the AP thermistor, 36 degrees, at time T1, so that the temperature may become 35 degrees. Further, as the temperature of the external display, the temperature of the USB thermistor USB_THM may be used. The parameter value (−1) may be applied at the temperature of the USB thermistor, 36 degrees, at time T1, so that the temperature may become 35 degrees. Further, whether communication, e.g., LTE/5G, is used may be known using the PAM_THM measuring the temperature for the RF module. The parameter value (+3) may be applied at the temperature of the PAM_THM, 40 degrees, at time T1, so that the temperature may become 43 degrees. Further, use of Wi-Fi may be a heat source. Thus, the parameter value (+1) may be applied at the temperature of the WIFI_THM, 38 degrees, for the Wi-Fi module at time T1, so that the temperature may become 39 degrees. Further, since the charging operation also corresponds to a heat source, the temperature may become 44 degrees by applying the parameter value (+4) with respect to the temperature of the charging thermistor CHG_THM, 40 degrees, at time T1.

As described above, the temperature values reflecting the operational state of the electronic device 500 at time T1 become 42, 48, 35, 35, 43, 39, and 44. Among these temperature values, the temperature of the charging thermistor CHG_THM, i.e., the temperature value obtained by applying the parameter value according to the charging state, is highest. Thus, the final surface temperature is 44 degrees. The electronic device 500 may finally determine that the control step corresponding to 44 degrees is control step 3.

FIG. 8C exemplifies temperature values reflecting the operational state of the electronic device with respect to time T3 in FIG. 8A. Referring to FIG. 8C, since the predicted surface temperature at time T3 is 45 degrees, the temperature may become 47 degrees by applying the keyboard activity on parameter value (+20), become 45 degrees by applying the parameter value (0) when the external input device is not used, become 37 degrees by applying the parameter value (0) when the display is used, become 38 degrees by applying the parameter value (−2) when the external display is connected, become 39 degrees by applying the parameter value (+3) when communication is used, become 40 degrees by applying the parameter value (+1) when Wi-Fi is used, and become 43 degrees by applying the parameter value (0) when charging is turned off. As described above, the temperature values reflecting the operational state of the electronic device at time T3 become 47, 45, 47, 38, 39, 40, and 43. Among these temperature values, the predicted surface temperature of 47 degrees is highest.

Thus, the electronic device 500 may finally determine that the control step corresponding to 47 degrees is control step 4.

FIG. 8D exemplifies temperature values reflecting the operational state of the electronic device with respect to time T5 in FIG. 8A. Referring to FIG. 8D, since the predicted surface temperature at time T5 is 46 degrees, the temperature may become 49 degrees by applying the keyboard activity on parameter value (+3), become 46 degrees by applying the parameter value (0) when the external input device is not used, become 44 degrees by applying the parameter value (−2) when the display is not used, become 45 degrees by applying the parameter value (0) when the external display is not connected, become 42 degrees by applying the parameter value (5) when communication is used, become 40 degrees by applying the parameter value (0) when Wi-Fi is used, and become 47 degrees by applying the parameter value (+5) in the charging-on state. As described above, the temperature values reflecting the operational state of the electronic device at time T5 become 49, 46, 44, 45, 42, 40, and 47. Among these temperature values, the predicted surface temperature of 49 degrees is highest. Thus, the electronic device 500 may finally determine that the control step corresponding to 49 degrees is control step 5.

In operation 750, the electronic device 500 may perform control with the charging power corresponding to the identified charging control step. If the surface temperature is finally determined, the electronic device 500 may adjust the power supplied to the battery to correspond to the determined control step. In this case, the electronic device 500 may set the output to the battery based on the initially set input power and adjust the current or voltage according to the battery capacity value.

In operation 755, the electronic device 500 may identify whether charging is terminated. According to an embodiment, the electronic device 500 may detect the voltage of the connector (e.g., power terminal) through the power management circuit 580 while monitoring the charging context. If charging is complete (e.g., fully charged state) while charging the battery of the electronic device 500 with the power supplied from the external device, power supply through the connector (e.g., power terminal) may be stopped. For example, the voltage detected for the power terminal may fall within a designated range (e.g., the voltage after full charge or 0V).

Meanwhile, as long as charging is not terminated, e.g., if the voltage detected for the power terminal does not fall within the designated range, the electronic device 500 may return to operation 715 to repeat the above-described operations.

Figure 9:
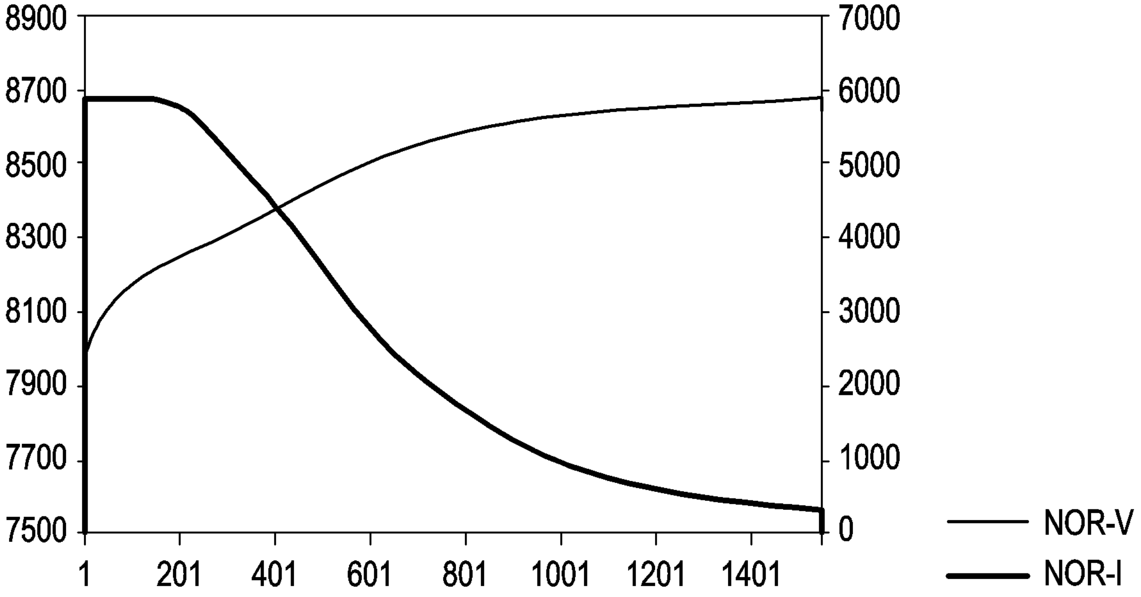
FIG. 9 is a graph illustrating charging control using a charging current or a charging voltage according to various embodiments.

FIG. 9 is a graph illustrating charging control using a charging current or a charging voltage according to various embodiments.

FIG. 9 is a graph illustrating changes in another voltage or current upon charging the battery. As shown in FIG. 9, it may be seen that as the battery is gradually charged through a constant current (CC) range and thus enters a constant voltage (CV) range, the charging current is gradually decreased until the battery is fully charged (100%). Accordingly, it may be advantageous in decreasing the surface temperature to control the voltage value rather than controlling the current value, in the constant voltage range. This is described below in detail with reference to FIGS. 10 and 11.

FIG. 10 is a view illustrating stepwise charging current adjustment according to a charging scheme and a control step according to various embodiments. FIG. 11 is a view illustrating stepwise charging voltage adjustment according to a charging scheme and a control step according to various embodiments.

FIG. 10 illustrates an example in which initial power of 9V/2.77 A for 25 W high-speed PD, 20V/2.25 A for 45 W high-speed PD, 19V/3.42 A for 68 W DC wire, 5V/1.8 A for 9 W normal wire, and 9V/1.67 A for 15 W high-speed wire is inputted. With respect to such initial power, in the constant current range, e.g., when the battery capacity is less than 80%, if control step 0 is assumed to be the maximum value of the initial power, control step 1, control step 2, control step 3, control step 4, and control step 5 may denote control steps of reducing it to 80%, 60%, 40%, 20%, and 10%, respectively. Accordingly, as the control step increases, the charging current may gradually be decreased. The charging current may be decreased at a certain rate with respect to the initial current corresponding to the corresponding control step. As shown in FIG. 10, it may be seen that the charging current is reduced at a certain rate according to each control step with respect to the initial power regardless of the type of power, so that the surface heat generation may be decreased.

In contrast, FIG. 11 illustrates an example in which in the constant voltage range, e.g., when the battery capacity is 80% or more with respect to the initial power, if control step 0 is assumed to be the maximum value of the initial power, the charging voltage is reduced at a certain rate according to each control step. As shown in FIG. 11, it may be seen that the charging voltage is reduced at a certain rate according to each control step with respect to the initial power regardless of the type of power. As such, it is possible to reduce the surface heat generation by decreasing the charging voltage for the battery.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, a non-transitory computer readable storage medium may store instructions, the instructions configured to be executed by at least one processor of an electronic device to enable the electronic device to perform at least one operation. The at least one operation may comprise measuring temperature values using a plurality of temperature sensors, in response to a temperature value associated with a battery being within a threshold value among the measured temperature values, calculating a predicted surface temperature based on at least one of the measured temperature values and a position of each temperature sensor, identifying a control step among a plurality of control steps based on an operational state of at least one device associated with the electronic device and the predicted surface temperature, and adjusting charging power for the battery in response to the identified control step.

What is claimed is:

1. An electronic device comprising:

a housing;

a battery;

a charging circuit;

a plurality of temperature sensors each disposed in a different positions within the housing;

at least one processor operatively connected with the battery, the charging circuit, and the plurality of temperature sensors; and memory, wherein the memory stores instructions configured to, when executed by the at least one processor, enable the electronic device to, measure temperature values using the plurality of temperature sensors based at least in part on a determination that an external device for charging is connected to the electronic device, in response to a temperature value associated with the battery being within a threshold range, calculate a predicted surface temperature based on a maximum value among values obtained by multiplying average temperature values measured using each of the plurality of temperature sensors by respective distances from a center position of the electronic device to the plurality of temperature sensors, identify a control step among a plurality of control steps based on an operational state of the electronic device and the predicted surface temperature, wherein the operational state includes at least one of aser activity state or user contact state, and adjust charging power for the battery through the charging circuit in response to the identified control step.

2. The electronic device of claim 1, wherein the instructions are configured to enable the electronic device to, predict the control step among the plurality of control steps based on the predicted surface temperature calculated based on the maximum value.

3. The electronic device of claim 2, wherein the instructions are configured to enable the electronic device to, identify the control step by adjusting the predicted control step based on the operational state of the electronic device.

4. The electronic device of claim 3, wherein the instructions are configured to enable the electronic device to, adjust the predicted control step, using a parameter value corresponding to an operational state of at least one peripheral device associated with the electronic device and the predicted surface temperature calculated based on the maximum value.

5. The electronic device of claim 1, wherein the instructions are configured to enable the electronic device to, adjust charging power for the battery through the charging circuit, in response to the identified control step, based at least in part on initial power from the connected external device.

6. The electronic device of claim 1, wherein the instructions are configured to enable the electronic device to, decrease a charging current for the battery in a constant current range, in response to the identified control step.

7. The electronic device of claim 1, wherein the instructions are configured to enable the electronic device to, decrease a charging voltage for the battery in a constant voltage range, in response to the identified control step, wherein the identified control step is identified by adjusting a predicted control step using a parameter value corresponding to the operational state of the electronic device and the predicted surface temperature calculated based on the maximum value, and wherein decreasing the charging voltage is based at least in part on initial power from the connected external device.

8. The electronic device of claim 4, wherein the at least one peripheral device associated with the electronic device further includes, at least one of an internal device of the electronic device and the external device connected with the electronic device.

9. The electronic device of claim 8, wherein the internal device of the electronic device includes at least one of a keyboard, a display, and communication circuitry, and wherein the external device connected with the electronic device includes at least one of an external keyboard or an external display.

10. The electronic device of claim 1, wherein the housing includes, a first housing including a first surface and a second surface facing in a direction opposite to a direction in which the first surface faces;

a second housing including a third surface corresponding to the first surface of the first housing and a fourth surface facing in a direction opposite to a direction in which the third surface faces; and a hinge rotatably connecting the first housing and the second housing, and wherein the electronic device further comprises a display disposed on the first surface of the first housing; and a keypad disposed on the third surface of the second housing.

11. A method for controlling surface heat generation in an electronic device, the method comprising:

measuring temperature values using a plurality of temperature sensors based at least in part on a determination that an external device for charging is connected to the electronic device;

in response to a temperature value associated with a battery being within a threshold range, calculating a predicted surface temperature based on a maximum value among values obtained by multiplying average temperature values measured using each of the plurality of temperature sensors by respective distances from a center position of the electronic device to the plurality of temperature sensors;

identifying a control step among a plurality of control steps based on an operational state of the electronic device and the predicted surface temperature, wherein the operational state includes at least one of user activity state or user contact state; and adjusting charging power for the battery in response to the identified control step.

12. The method of claim 11, wherein identifying the control step among the plurality of control steps includes, predicting the control step among the plurality of control steps based on the predicted surface temperature calculated based on the maximum value; and identifying the control step by adjusting the predicted control step based on the operational state of the electronic device.

13. The method of claim 12, wherein identifying the control step includes, adjusting the predicted control step, using a parameter value corresponding to an operational state of at least one peripheral device associated with the electronic device and the predicted surface temperature calculated based on the maximum value.

14. The method of claim 11, wherein adjusting the charging power for the battery in response to the identified control step includes decreasing a charging current for the battery in a constant current range in response to the identified control step based on initial power from the connected external device.

15. The method of claim 11, wherein adjusting the charging power for the battery in response to the identified control step includes decreasing a charging voltage for the battery in a constant voltage range in response to the identified control step based on initial power from the connected external device.

16. A non-transitory computer readable storage medium storing instructions, the instructions configured to be executed by at least one processor of an electronic device to enable the electronic device to perform at least one operation, the at least one operation comprising:

measuring temperature values using a plurality of temperature sensors based at least in part on a determination that an external device for charging is connected to the electronic device;

in response to a temperature value associated with a battery being within a threshold range among the measured temperature values, calculating a predicted surface temperature based on a maximum value among values obtained by multiplying average temperature values measured using each of the plurality of temperature sensors by respective distances from a center position of the electronic device to the plurality of temperature sensors;

identifying a control step among a plurality of control steps based on an operational state of the electronic device and the predicted surface temperature, wherein the operational state includes at least one of user activity state or user contact state; and adjusting charging power for the battery in response to the identified control step.

* * * * *